United States Patent
Burger et al.

(10) Patent No.: US 8,423,534 B2
(45) Date of Patent: Apr. 16, 2013

(54) ACTIVELY MANAGING RESOURCE BOTTLENECKS IN A DATABASE SYSTEM

(75) Inventors: Louis M. Burger, Escondido, CA (US); Douglas P. Brown, Rancho Santa Fe, CA (US); Thomas Julien, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 581 days.

(21) Appl. No.: 12/313,252

(22) Filed: Nov. 18, 2008

(65) Prior Publication Data
US 2010/0125565 A1   May 20, 2010

(51) Int. Cl.
*G06F 7/00* (2006.01)
*G06F 17/30* (2006.01)

(52) U.S. Cl.
USPC .......................................... 707/718; 707/720

(58) Field of Classification Search ................ 707/718, 707/720, 999.002
See application file for complete search history.

(56) References Cited

U.S. PATENT DOCUMENTS

| | | | |
|---|---|---|---|
| 6,957,211 B1* | 10/2005 | Tyulenev et al. | 707/718 |
| 6,990,503 B1* | 1/2006 | Luo et al. | 1/1 |
| 2006/0206473 A1* | 9/2006 | Kaluskar et al. | 707/4 |
| 2008/0098169 A1* | 4/2008 | Kaluskar et al. | 711/113 |

* cited by examiner

*Primary Examiner* — Aleksandr Kerzhner
(74) *Attorney, Agent, or Firm* — Gates & Cooper LLP; Ramin Mahboubian

(57) ABSTRACT

A computer-implemented method, apparatus and article of manufacture for optimizing a database query. Resource usage of one or more resources of the computer system are monitored. A condition code representative of the monitored resource usage is stored. A cost model is modified using the stored condition code. A query execution plan is generated for the database query using the modified cost model. The query execution plan is then executed in order to retrieve data from a database stored on the computer system, wherein the retrieved data is presented to a user for subsequent use and analysis.

27 Claims, 17 Drawing Sheets

ADMINISTRATOR

WORKLOAD QUERY (DELAY) MANAGER

| OPERATING ENVIRONMENT EVENT / SYSTEM CONDITION | PRODUCT JOIN | MERGE JOIN | LOCAL NESTED JOIN | HASH JOIN |
|---|---|---|---|---|
| GREEN | HIGH | HIGH | HIGH | HIGH |
| YELLOW | MEDIUM | TACTICAL | HIGH | LOW |
| RED | BACKGROUND | TACTICAL | MEDIUM | NO |

FIG. 13

ACTIVELY MANAGING RESOURCE BOTTLENECKS IN A DATABASE SYSTEM

BACKGROUND

Prior art query optimizers typically rely upon a cost model to choose the best query execution plan for any given query. While prior art query optimizers do a remarkably good job of estimating both the cost and the cardinality of most queries, many assumptions underlie this mathematical model. For example, cost estimates are heavily dependent upon the optimizer's estimates for the number of rows (cardinalities), which will result at each step of the query plan. For complex queries involving many predicates and/or operations, these estimates rely upon statistics on the database and modeling assumptions that may or may not be true for a given database. In other words, estimates rely on accurate statistics of database characteristics, beginning with the number of rows for each table or index.

In most optimizers, alternative query execution plans are generated for a given query and the optimizer selects the optimal query plan, which may be the most cost-effective execution plan or one of the more cost-effective execution plans. The optimizer identifies an execution plan (query plan, join plan, or strategy) that reduces the estimated response time of a given query. The response time is the amount of time it takes to complete the execution of the query on the given target system.

One technique of query optimization use is a cost model to estimate the response time of a given query plan and to search the space of query plans to return a plan with a low cost. In the cost-based optimization model, different methods for doing a unit of work is compared and the most efficient method is selected (the plan with the lowest cost). Because the number of alternatives can be quite large, the query optimizer module uses statistics and/or sampling techniques to reduce the search space in optimizing queries.

However, prior art optimizers fail to consider the impact of run-time statistics (real-time system conditions), as they do not manage unforeseen impacts, such as unplanned situations (e.g. a request volume surge, the exhaustion of shared resources, or external conditions like component outages) or even planned situations (e.g. systems maintenance or data load). For example, modern computing systems often execute a variety of requests concurrently and operate in a dynamic environment of cooperative systems, each comprising of numerous hardware components subject to failure or degradation.

Many different types of system conditions or operating environment events can impact negatively the performance of requests currently executing on a computer system. These conditions or events can remain undetected for a prolonged period of time, causing a compounding negative effect on requests executing during that interval. When problematic conditions or events are detected, sometimes in an ad hoc and manual fashion, the computing system administrator may still not be able to take an appropriate course of action, and may either delay corrective action, act incorrectly or not act at all.

A typical impact of not managing for conditions or events is to deliver inconsistent response times to users. For example, often systems execute in an environment of very cyclical usage over the course of any day, week, or other business cycle. If a user ran a report near standalone on a Wednesday afternoon, he/she may expect that same performance with many concurrent users on a Monday morning. However, based on the laws of linear systems performance, a request simply cannot deliver the same response time when running stand-alone as when it runs competing with high volumes of concurrency.

Moreover, overall database performance is best achieved when there is a balanced usage of system resources such that no one resource becomes a bottleneck, wherein the primary resources in a database system include CPU, disk I/O, network, and memory. However, the corrective action for resource bottlenecks is usually limited to alerting the user who, in turn, must reduce the active workload or perform some other manual solution. Given the fact that resource bottlenecks are often a direct result of the characteristics of the execution plans chosen by a query optimizer, it would be helpful if the optimizer could be involved in any corrective action. Unfortunately, prior art optimizers are incapable of directly responding to run-time identified resource bottlenecks. In fact, in most systems, the optimizer is oblivious to run-time conditions and its chosen plans may be making the ongoing condition even worse.

Therefore, there is a need in the art for query optimizations that can respond effectively to resource bottlenecks. Specifically, there is need for optimizers that dynamically adjust query execution plans in response to resource bottlenecks as such bottlenecks occur in real-time. The present invention satisfies this need.

SUMMARY

In general, the invention discloses a computer-implemented method, apparatus, and article of manufacture for optimizing a database query in a computer system. In one embodiment, the steps and functions include monitoring resource usage of one or more resources of the computer system; storing a condition code representative of the monitored resource usage; modifying a cost model using the stored condition code; generating a query execution plan for the database query using the modified cost model; and executing the query execution plan in order to retrieve data from a database stored on the computer system, wherein the retrieved data is presented to a user for subsequent use and analysis.

Other features and advantages will become apparent from the description and claims that follow.

BRIEF DESCRIPTION OF THE DRAWINGS

FIG. 13 illustrates an n-dimensional matrix that is used to perform query optimization using system conditions and operating environment events.

DETAILED DESCRIPTION

Figure 1:
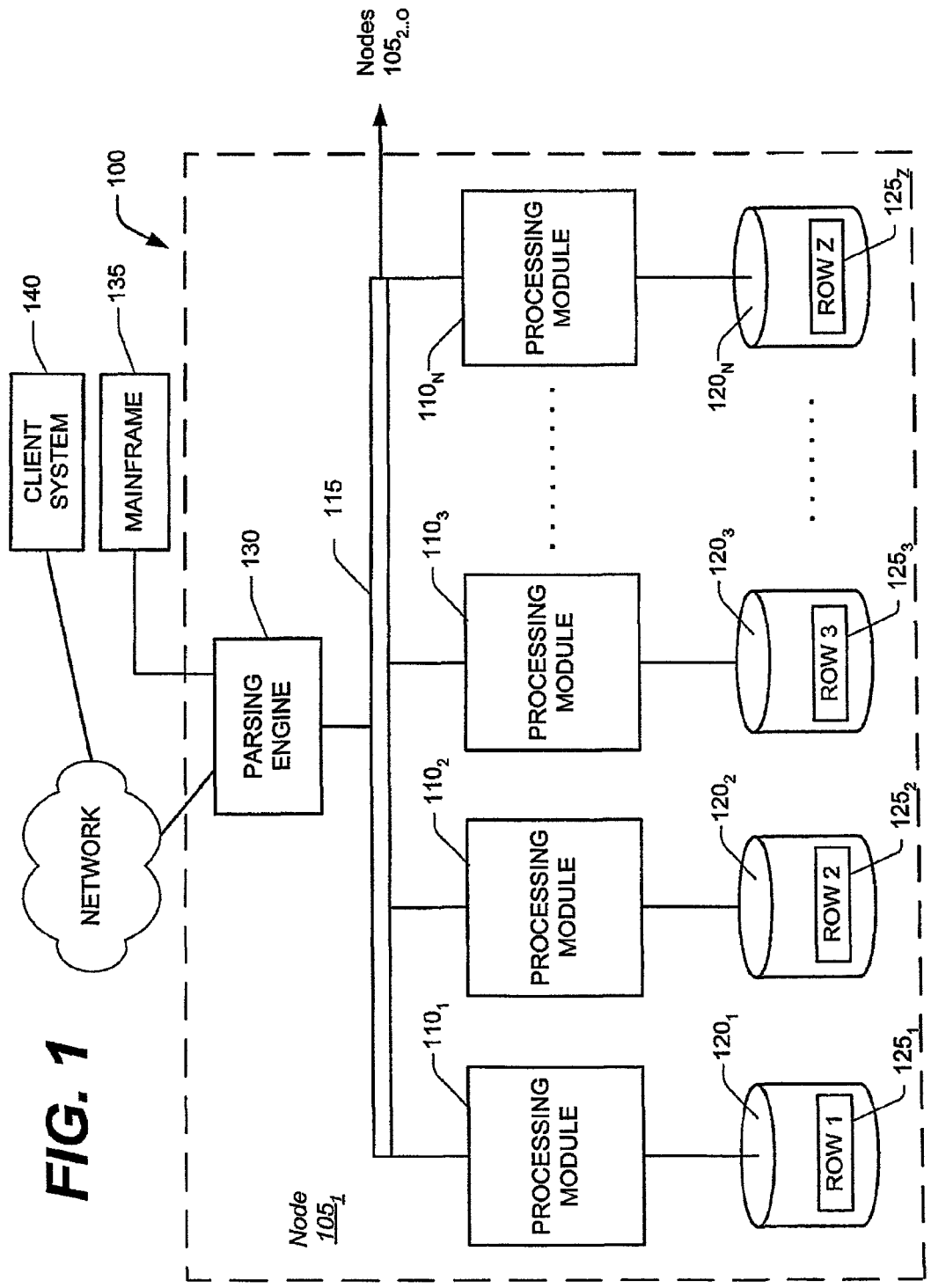
FIG. 1 is a block diagram of a node of a database system.

The event management technique disclosed herein has particular application to large databases that might contain many millions or billions of records managed by a database system ("DBS") 100, such as a Teradata Active Data Warehouse (ADW) available from NCR Corporation. FIG. 1 shows a sample architecture for one node $105_1$ of the DBS 100. The DBS node $105_1$ includes one or more processing modules $110_{1...N}$, connected by a network 115 that manage the storage and retrieval of data in data storage facilities $120_{1...N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors. Each virtual processor is generally termed an Access Module Processor (AMP) in the Teradata Active Data Warehousing System.

For the case in which N virtual processors are running on an M processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1...N}$ manages a portion of a database that is stored in a corresponding one of the data storage facilities $120_{1...N}$. Each of the data storage facilities $120_{1...N}$ includes one or more disk drives. The DBS 100 may include multiple nodes $105_{2...N}$ in addition to the illustrated node $105_1$, connected by extending the network 115.

The system stores data in one or more tables in the data storage facilities $120_{1...N}$. The rows $125_{1...Z}$ of the tables are stored across multiple data storage facilities $120_{1...N}$ to ensure that the system workload is distributed evenly across the processing modules $110_{1...N}$. A Parsing Engine (PE) 130 organizes the storage of data and the distribution of table rows $125_{1...Z}$ among the processing modules $110_{1...N}$. The PE 130 also coordinates the retrieval of data from the data storage facilities $120_{1...N}$ in response to queries received from a user at a mainframe 135 or a client computer 140. The DBS 100 usually receives queries in a standard format, such as SQL.

Figure 2:
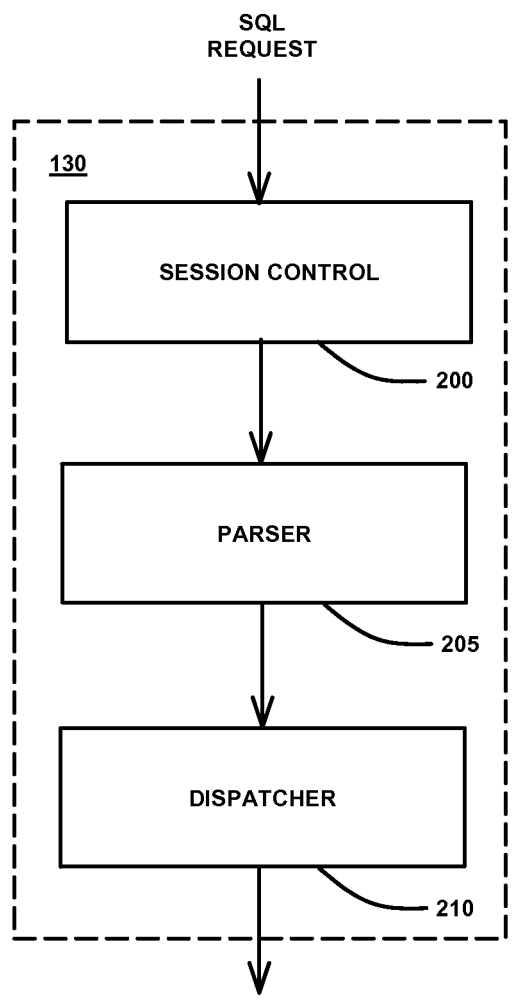
FIG. 2 is a block diagram of a parsing engine.

In one example system, the PE 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
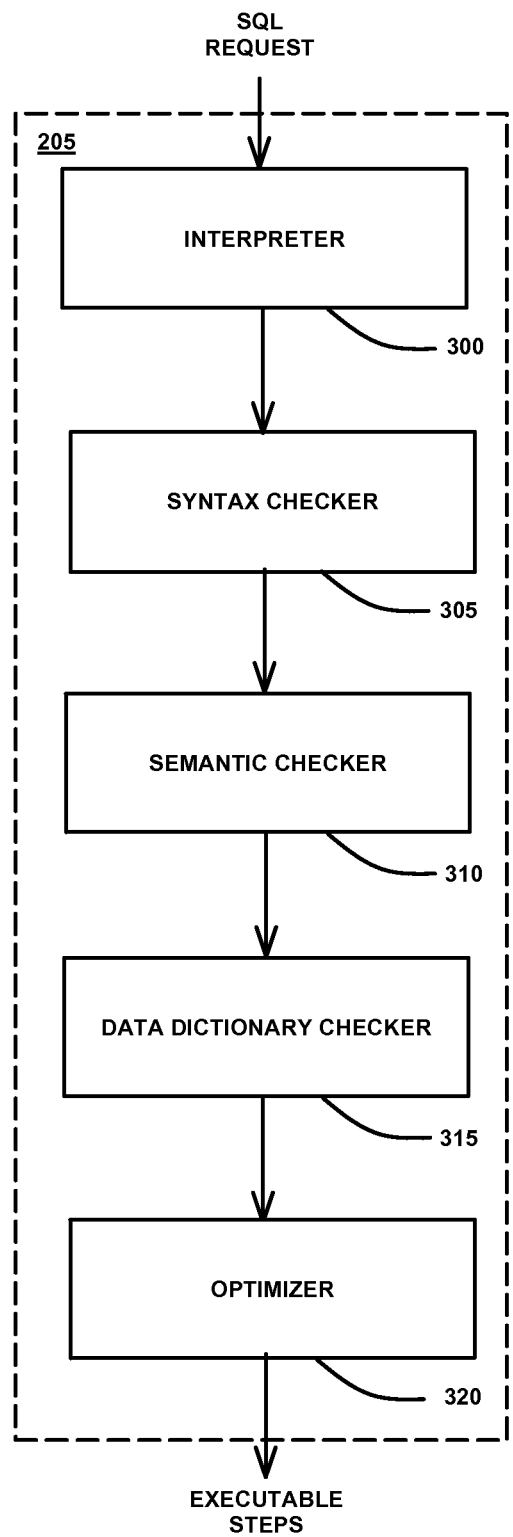
FIG. 3 is a flow chart of a parser.

Once the session control 200 allows a session to begin, a user may submit a SQL request that is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315).

Finally, the parser 205 runs an Optimizer (block 320) that generates and selects an optimal query execution plan (e.g., the least expensive plan) to perform the request. The Optimizer 320 may include, for example, the functionality described in: U.S. Utility patent application Ser. No. 10/730,629, by Douglas P. Brown and Bhashyam Ramesh, and entitled Closed-Loop Estimation of Request Costs; and U.S. Utility patent application Ser. No. 11/328,702, filed Jan. 10, 2006, by Douglas P. Brown, Anita Richards, and Bhashyam Ramesh, and entitled Closed-Loop Predicate Analysis; both of which applications are incorporated by reference herein. Moreover, in one embodiment of the present invention, the Optimizer 320 includes performance information, such as actual cost information or intermediate results, when developing an optimal plan to perform the request, as described in more detail below.

Once a query execution plan is selected, it is scheduled for execution by the DBS 100. The DBS 100 described herein accepts performance goals for each workload as inputs, and dynamically adjusts its own performance, such as by allocating DBS 100 resources and throttling back incoming work. In one example system, the performance parameters are called priority scheduler parameters. When the priority scheduler is adjusted, weights assigned to resource partitions and allocation groups are changed. Adjusting how these weights are assigned modifies the way access to the CPU, disk and memory is allocated among requests. Given performance objectives for each workload and the fact that the workloads may interfere with each other's performance through competition for shared resources, the DBS 100 may find a performance setting that achieves one workload's goal but makes it difficult to achieve another workload's goal.

The performance goals for each workload will vary widely as well, and may or may not be related to their resource demands. For example, two workloads that execute the same application and DBS 100 code could have differing performance goals simply because they were submitted from different departments in an organization. Conversely, even though two workloads have similar performance objectives, they may have very different resource demands.

The system includes a "closed-loop" workload management architecture capable of satisfying a set of workload-specific goals. In other words, the system is a goal-oriented workload management system capable of supporting complex workloads and capable of self-adjusting to various types of workloads. In Teradata, the workload management system is generally referred to as Teradata Active System Management (TASM).

The system's operation has four major phases: 1) assigning a set of incoming request characteristics to workload groups, assigning the workload groups to priority classes, and assigning goals (called Service Level Goals or SLGs) to the workload groups; 2) monitoring the execution of the workload groups against their goals; 3) regulating (adjusting and managing) the workload flow and priorities to achieve the SLGs; and 4) correlating the results of the workload and taking action to improve performance. The performance improvement can be accomplished in several ways: 1) through performance tuning recommendations such as the creation or change in index definitions or other supplements to table data, or to recollect statistics, or other performance tuning actions, 2) through capacity planning recommendations, for example increasing system power, 3) through utilization of results to enable optimizer self-learning, and 4) through recommending adjustments to SLGs of one workload to better complement the SLGs of another workload that it might be impacting. All recommendations can either be enacted automatically, or after "consultation" with the database administrator (DBA).

Figure 4:
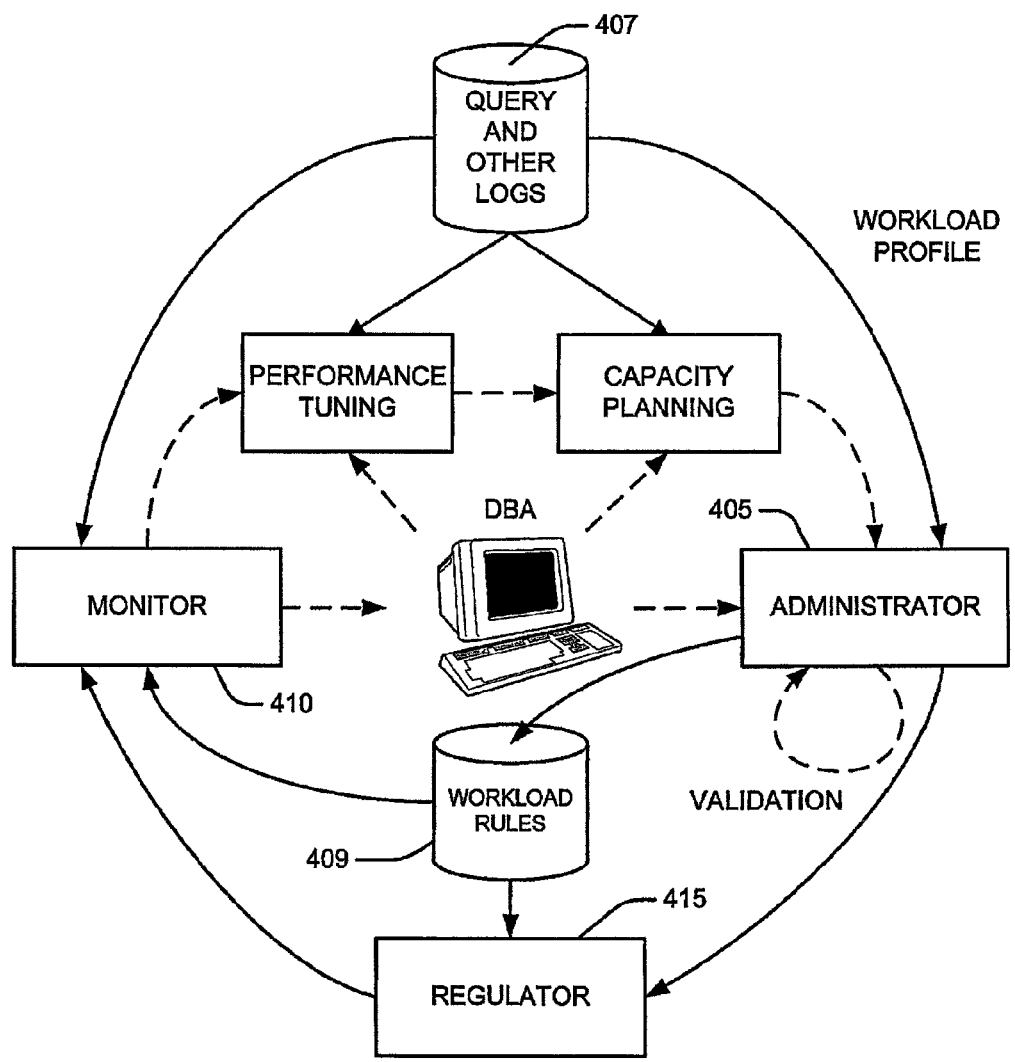
FIGS. 4-7 are block diagrams of a system for administering the workload of a database system.

The system includes the following components (illustrated in FIG. 4):

1) Administrator (block 405): This component provides a GUI to define workloads and their SLGs and other workload management requirements. The administrator 405 accesses data in logs 407 associated with the system, including a database query log (DBQL), and receives capacity planning and performance tuning inputs as discussed above. The administrator 405 is a primary interface for the DBA. The administrator also establishes workload rules 409, which are accessed and used by other elements of the system.

2) Monitor (block 410): This component provides a top level dashboard view, and the ability to drill down to various details of workload group performance, such as aggregate execution time, execution time by request, aggregate resource consumption, resource consumption by request, etc. Such data is stored in the query log and other logs 407 available to the monitor. The monitor also includes processes that initiate the performance improvement mechanisms listed above and processes that provide long term trend reporting, which may including providing performance improvement recommendations. Some of the monitor functionality may be performed by the regulator, which is described in the next paragraph.

3) Regulator (block 415): This component dynamically adjusts system settings and/or projects performance issues and either alerts the DBA or user to take action, for example, by communication through the monitor, which is capable of providing alerts, or through the exception log, providing a way for applications and their users to become aware of, and take action on, regulator actions. Alternatively, the regulator 415 can automatically take action by deferring requests or executing requests with the appropriate priority to yield the best solution given requirements defined by the administrator (block 405). As described in more detail below, the regulator 415 may also use a set of open application programming interfaces (APIs) to access and monitor global memory partitions.

The workload management administrator (block 405), or "administrator," is responsible for determining (i.e., recommending) the appropriate application settings based on SLGs. Such activities as setting weights, managing active work tasks and changes to any and all options will be automatic and taken out of the hands of the DBA. The user will be masked from all complexity involved in setting up the priority scheduler, and be freed to address the business issues around it.

Figure 5:
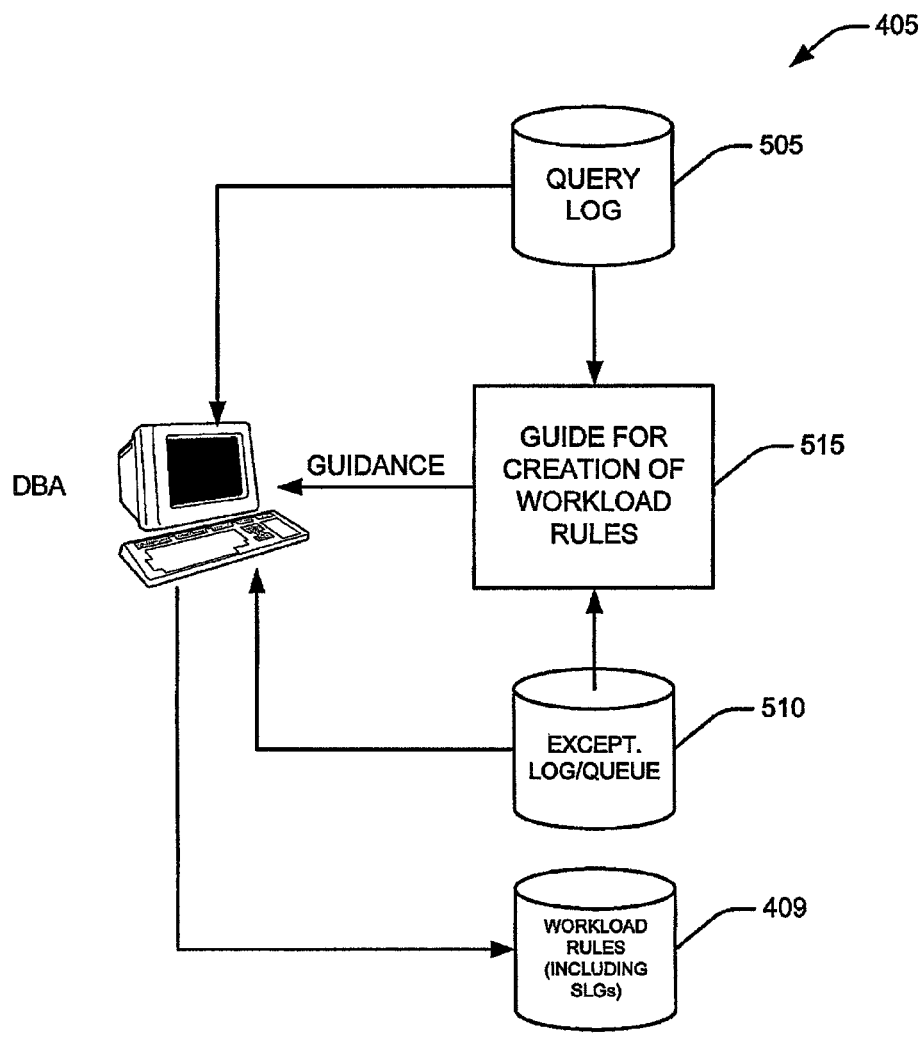

As shown in FIG. 5, the workload management administrator (block 405) allows the DBA to establish workload rules, including SLGs, which are stored in a storage facility 409, accessible to the other components of the system. The DBA has access to a query log 505, which stores the steps performed by the DBS 100 in executing a request along with database statistics associated with the various steps, and an exception log/queue 510, which contains records of the system's deviations from the SLGs established by the administrator. With these resources, the DBA can examine past performance and establish SLGs that are reasonable in light of the available system resources. In addition, the system provides a guide for creation of workload rules 515 which guides the DBA in establishing the workload rules 409. The guide accesses the query log 505 and the exception log/queue 510 in providing its guidance to the DBA.

The administrator assists the DBA in: a) Establishing rules for dividing requests into candidate workload groups, and creating workload group definitions. Requests with similar characteristics (users, application, table, resource requirement, etc) are assigned to the same workload group. The system supports the possibility of having more than one workload group with similar system response requirements. b) Refining the workload group definitions and defining SLGs for each workload group. The system provides guidance to the DBA for response time and/or arrival rate threshold setting by summarizing response time and arrival rate history per workload group definition versus resource utilization levels, which it extracts from the query log (from data stored by the regulator, as described below), allowing the DBA to know the current response time and arrival rate patterns. The DBA can then cross-compare those patterns to satisfaction levels or business requirements, if known, to derive an appropriate response time and arrival rate threshold setting, i.e., an appropriate SLG. After the administrator specifies the SLGs, the system automatically generates the appropriate resource allocation settings, as described below. These SLG requirements are distributed to the rest of the system as workload rules. c) Optionally, establishing priority classes and assigning workload groups to the classes. Workload groups with similar performance requirements are assigned to the same class. d) Providing proactive feedback (i.e., validation) to the DBA regarding the workload groups and their SLG assignments prior to execution to better assure that the current assignments can be met, i.e., that the SLG assignments as defined and potentially modified by the DBA represent realistic goals. The DBA has the option to refine workload group definitions and SLG assignments as a result of that feedback.

Figure 6A:
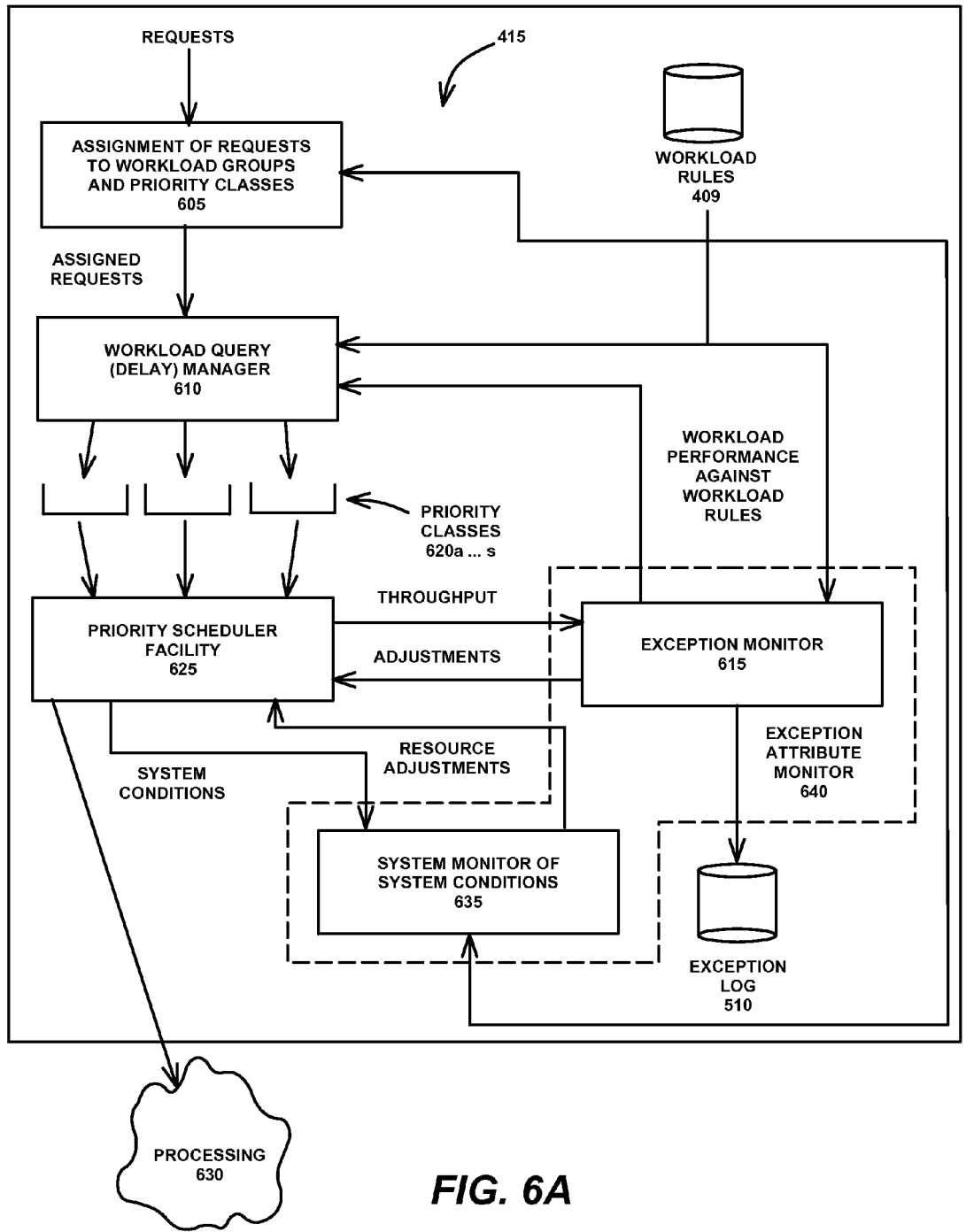
Figure 6B:
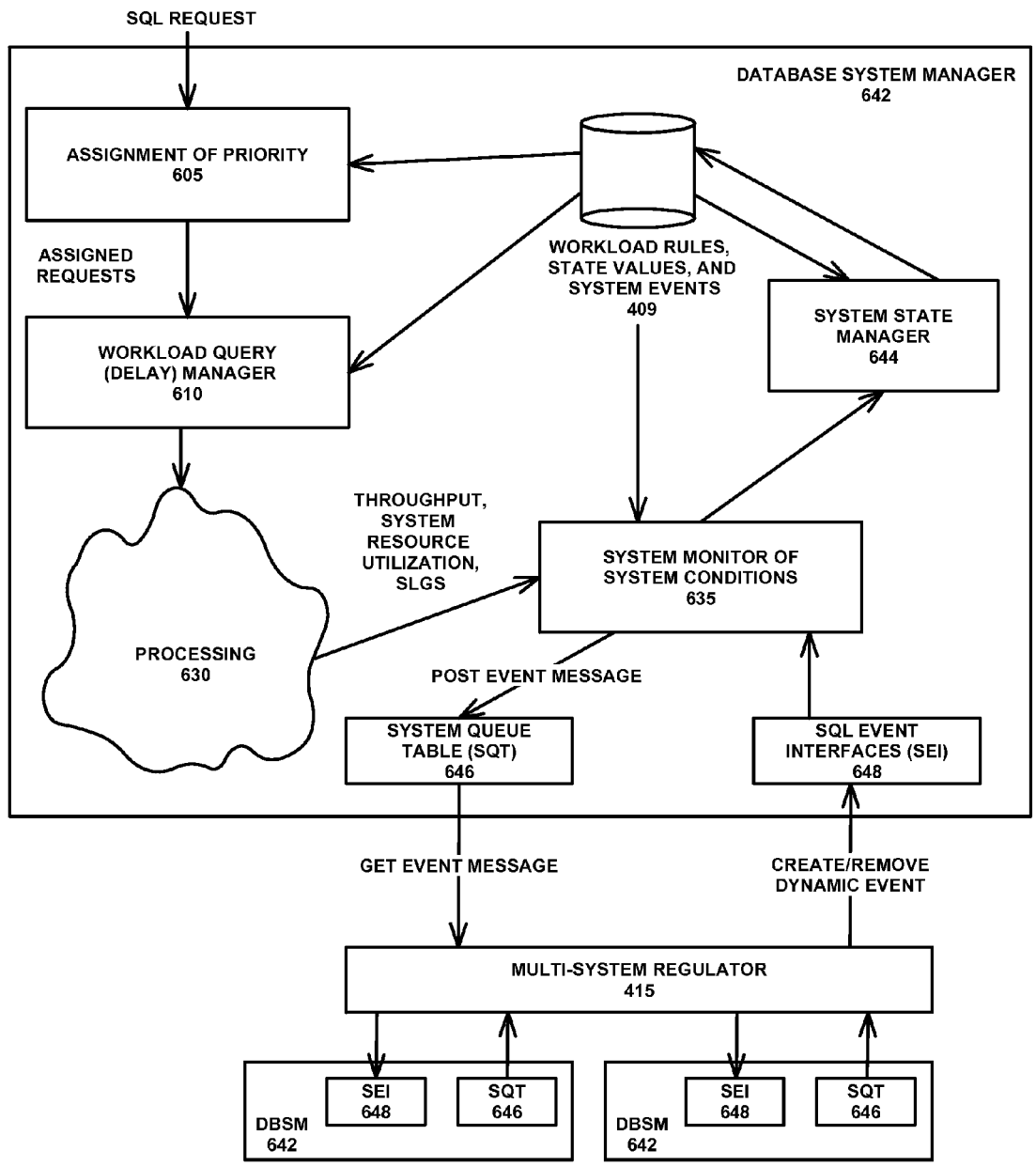

The internal monitoring and regulating component (regulator 415), illustrated in more detail in FIGS. 6A and 6B, accomplishes its objective by dynamically monitoring the workload characteristics (defined by the administrator) using workload rules or other heuristics based on past and current performance of the system that guide two feedback mechanisms. It does this before the request begins execution and at periodic intervals during query execution. Prior to query execution, an incoming request is examined to determine in which workload group it belongs, based on criteria as described in more detail below. Concurrency or arrival rate levels, i.e., the numbers of concurrent executing queries from each workload group, are monitored or the rate at which they have been arriving, and if current workload group levels are above an administrator-defined threshold, a request in that workload group waits in a queue prior to execution until the level subsides below the defined threshold. Query execution requests currently being executed are monitored to determine if they still meet the criteria of belonging in a particular workload group by comparing request execution characteristics to a set of exception conditions. If the result suggests that a request violates the rules associated with a workload group, an action is taken to move the request to another workload group or to abort it, and/or alert on or log the situation with potential follow-up actions as a result of detecting the situation. Current response times and throughput of each workload group are also monitored dynamically to determine if they are meeting SLGs. A resource weight allocation for each performance group can be automatically adjusted to better enable meeting SLGs using another set of heuristics described with respect to FIGS. 6A and 6B.

As shown in FIG. 6A, the regulator 415 receives one or more requests, each of which is assigned by an assignment process (block 605) to a workload group and, optionally, a priority class, in accordance with the workload rules 409. The assigned requests are passed to a workload query (delay) manager 610, which is described in more detail with respect to FIG. 7. The regulator 415 includes an exception monitor 615 for detecting workload exceptions, which are recorded in a log 510.

In general, the workload query (delay) manager 610 monitors the workload performance from the exception monitor 615, as compared to the workload rules 409, and either allows the request to be executed immediately or places it in a queue for later execution, as described below, when predetermined conditions are met.

If the request is to be executed immediately, the workload query (delay) manager 610 places the requests in buckets $620_{a \ldots s}$ corresponding to the priority classes to which the requests were assigned by the administrator 405. A request processor function performed under control of a priority scheduler facility (PSF) 625 selects queries from the priority class buckets $620_{a \ldots s}$, in an order determined by the priority associated with each of the buckets $620_{a \ldots s}$, and executes it, as represented by the processing block 630 on FIG. 6A.

The PSF 625 also monitors the request processing and reports throughput information, for example, for each request and for each workgroup, to the exception monitor 615. Also included is a system condition monitor 635, which is provided to detect system conditions, such as node failures. The system condition monitor 635 provides the ability to dynamically monitor and regulate critical resources in global memory. The exception monitor 615 and system monitor 635 collectively define an exception attribute monitor 640.

The exception monitor 615 compares the throughput with the workload rules 409 and stores any exceptions (e.g., throughput deviations from the workload rules) in the exception log/queue 510. In addition, the exception monitor 615 provides system resource allocation adjustments to the PSF 625, which adjusts system resource allocation accordingly, e.g., by adjusting the priority scheduler weights. Further, the exception monitor 615 provides data regarding the workgroup performance against workload rules to the workload query (delay) manager 610, which uses the data to determine whether to delay incoming requests, depending on the workload group to which the request is assigned.

As can be seen in FIG. 6A, the system provides two feedback loops. The first feedback loop includes the PSF 625 and the exception monitor 615. In this first feedback loop, the system monitors, on a short-term basis, the execution of requests to detect deviations greater than a short-term threshold from the defined service level for the workload group to which the requests were defined. If such deviations are detected, the DBS 100 is adjusted, e.g., by adjusting the assignment of system resources to workload groups.

The second feedback loop includes the workload query (delay) manager 610, the PSF 625 and the exception monitor 615. In this second feedback loop, the system monitors, on a long-term basis, to detect deviations from the expected level of service greater than a long-term threshold. If it does, the system adjusts the execution of requests, e.g., by delaying, swapping out or aborting requests, to better provide the expected level of service. Note that swapping out requests is one form of memory control in the sense that before a request is swapped out it consumes memory and after it is swapped out it does not. While this is the preferable form of memory control, other forms, in which the amount of memory dedicated to an executing request can be adjusted as part of the feedback loop, are also possible.

FIG. 6B illustrates an alternative embodiment and additional details relating to the components and processing performed by a multi-system virtual regulator 415 in accordance with one or more embodiments of the invention. The multi-system workload management process may consist of the following architectural components: database system manager 642, system/workload rules 409, system events, system events monitor 635, system state manager 644, system queue table 646, interfaces 648 to create/remove dynamic system events, and a multi-system regulator 415. Each of these components is described in further detail below.

Database system manager 642—Each database system 100 contains a database system manager (DBSM) process 642 that regulates the workload of the system 100 based on the system rules and system events 409.

System/workload rules 409—Each database system 100 has a set of rules that define states based on time periods and system conditions, task limits per state, and task priorities per state. Task limits limit the number of jobs that can run based on user, account, or some other criteria. Task priorities define the priority in which each job will run based on user, account, or some other criteria.

System Events—Each database system 100 has a set of defined events that define a system condition, an event trigger, and an action. System conditions include response time goals, CPU usage, nodes down, system throughput, and system resource utilization. An action is an action to perform when the event is triggered. (Actions include sending an alert, posting a message to a queue table, changing the system state.)

System Events Monitor 635—Each database system 100 has a System Events Monitor 635 that is checking system conditions against the system events and performing the actions. The Systems Events Monitor 635 posts event messages to the System Queue Table 646 to alert the multi-systems regulator 415 of a system change.

System State Manager 644—Each database system 100 has a System State Manager 644 that adjusts the state of the system 100 (workload priorities and limits) based on the system events.

System Queue Table 646—The System Queue Table (SQT) 646 provides the interface between the System Events Monitor 635 and the Multi-System Regulator 415. It is a message queue for sending and receiving messages. Interfaces 648 to Create/Remove Dynamic System Events—SQL event interfaces (SEI) 648 provide the capability to create or remove a dynamic system event. A dynamic system event can perform all the actions of a normal system event include sending an alert, posting a message to a queue table, changing the system state. A dynamic system event provides the multi-system regulator 415 the capability to adjust the state of a single system 100.

Multi-System Regulator 415—As described above, the Multi-System Regulator 415 is a process that monitors and adjusts the states of one or more systems 100 based on the system conditions of each of the systems 100.

With each of the components described above, embodiments of the invention can provide a multi-system workload management process. The following describes the architectural flow (steps) of such a process.

1. The multi-system regulator 415 waits on the system queue table 646 of each database system 100 for event messages from the system 100.

2. Each database system 100 has a system event monitor 635 that is comparing system 100 activity, utilization and resources against defined system events 409. When a system event 409 is triggered, the system event monitor 635 posts a message on the system queue table 646.
3. The multi-system regulator 415 receives a message from the system queue table 646. Based on the message type, the multi-system regulator 415 creates a dynamic event on one or more systems 100 using the SQL event interfaces 648.
4. The creation of the dynamic event causes the system state manager 644 to adjust the state of the database system 100 to the desired set of workload priorities and task limits.
5. When the system event monitor 635 determines that system conditions 409 have returned to a normal condition, the monitor 635 posts an end message on the system queue table 646.
6. The multi-system regulator 415 receives the message from the system queue table 646. The regulator 415 then uses the SQL event interfaces 648 to remove the dynamic event.
7. The removal of the dynamic event causes the system state manager 644 to return the database system 100 to the normal state.

Figure 7:
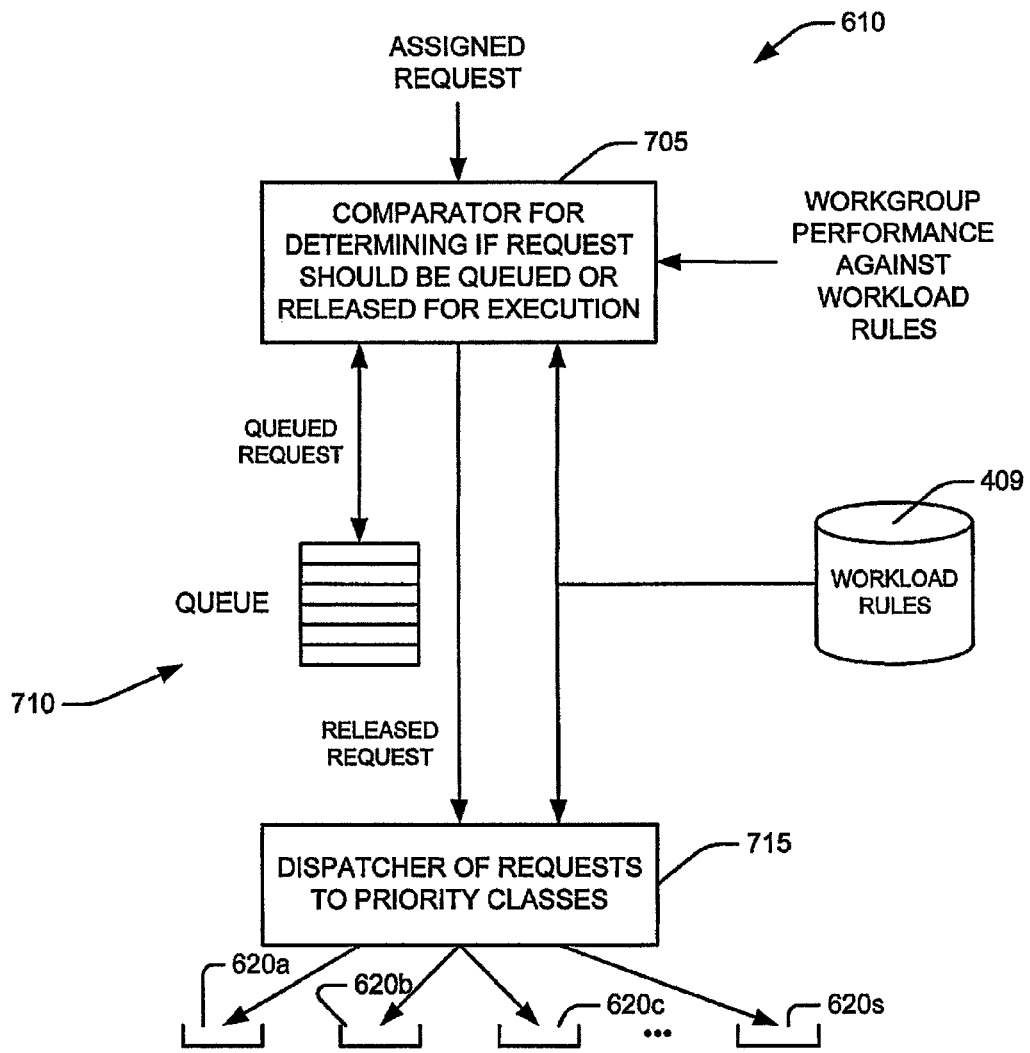

The workload query (delay) manager 610, shown in greater detail in FIG. 7, receives an assigned request as an input. A comparator 705 determines if the request should be queued or released for execution. It does this by determining the workload group assignment for the request and comparing that workload group's performance against the workload rules, provided by the exception monitor 615. For example, the comparator 705 may examine the concurrency level of requests being executed under the workload group to which the request is assigned. Further, the comparator may compare the workload group's performance against other workload rules.

If the comparator 705 determines that the request should not be executed, it places the request in a queue 710 along with any other requests for which execution has been delayed. The comparator 705 continues to monitor the workgroup's performance against the workload rules and when it reaches an acceptable level, it extracts the request from the queue 710 and releases the request for execution. In some cases, it is not necessary for the request to be stored in the queue to wait for workgroup performance to reach a particular level, in which case it is released immediately for execution.

Once a request is released for execution it is dispatched (block 715) to priority class buckets $620_a \ldots _s$, where it will await retrieval and processing 630 by one of a series of AMP Worker Tasks (AWTs) within processing block 630. An AWT is a thread/task that runs inside of each virtual AMP. An AWT is generally utilized to process requests/queries from users, but may also be triggered or used by internal database software routines, such as deadlock detection.

The exception monitor 615, receives throughput information from the AWT. A workload performance to workload rules comparator 705 compares the received throughput information to the workload rules and logs any deviations that it finds in the exception log/queue 510. It also generates the workload performance against workload rules information that is provided to the workload query (delay) manager 610.

Pre-allocated AWTs are assigned to each AMP and work on a queue system. That is, each AWT waits for work to arrive, performs the work, and then returns to the queue and waits for more work. Due to their stateless condition, AWTs respond quickly to a variety of database execution needs. At the same time, AWTs serve to limit the number of active processes performing database work within each AMP at any point in time. In other words, AWTs play the role of both expeditor and governor of requests/queries.

AMP worker tasks are one of several resources that support the parallel performance architecture within the Teradata database. AMP worker tasks are of a finite number, with a limited number available to perform new work on the system. This finite number is an orchestrated part of the internal work flow management in Teradata. Reserving a special set of reserve pools for single and few-AMP queries may be beneficial for active data warehouse applications, but only after establishing a need exists. Understanding and appreciating the role of AMP worker tasks, both in their availability and their scarcity, leads to the need for a more pro-active management of AWTs and their usage.

AMP worker tasks are execution threads that do the work of executing a query step, once the step is dispatched to the AMP. They also pick up the work of spawned processes, and of internal tasks such as error logging or aborts. Not being tied to a particular session or transaction, AMP worker tasks are anonymous and immediately reusable and are able to take advantage of any of the CPUs. Both AMPs and AWTs have equal access to any CPU on the node. A fixed number of AWTs are pre-allocated at startup for each AMP in the configuration, with the default number being 80. All of the allocated AWTs can be active at the same time, sharing the CPUs and memory on the node.

When a query step is sent to an AMP, that step acquires a worker task from the pool of available AWTs. All of the information and context needed to perform the database work is contained within the query step. Once the step is complete, the AWT is returned to the pool. If all AMP worker tasks are busy at the time the message containing the new step arrives, then the message will wait in a queue until an AWT is free. Position in the queue is based first on work type, and secondarily on priority, which is carried within the message header. Priority is based on the relative weight that is established for the PSF 625 allocation group that controls the query step. Too much work can flood the best of databases. Consequently, all database systems have built-in mechanisms to monitor and manage the flow of work in a system. In a parallel database, flow control becomes even more pressing, as balance is only sustained when all parallel units are getting their fair portion of resources.

The Teradata database is able to operate near the resource limits without exhausting any of them by applying control over the flow of work at the lowest possible level in the system. Each AMP monitors its own utilization of critical resources, AMP worker tasks being one. If no AWTs are available, it places the incoming messages on a queue. If messages waiting in the queue for an AWT reach a threshold value, further message delivery is throttled for that AMP, allowing work already underway to complete. Other AMPs continue to work as usual.

One technique that has proven highly effective in helping Teradata to weather extremely heavy workloads is having a reasonable limit on the number of active tasks on each AMP. The theory behind setting a limit on AWTs is twofold: 1) that it is better for overall throughput to put the brakes on before exhaustion of all resources is reached; and 2) keeping all AMPs to a reasonable usage level increases parallel efficiency. However this is not a reasonable approach in a dynamic environment.

Ideally, the minimum number of AWTs that can fully utilize the available CPU and I/O are employed. After full use of resources has been attained, adding AWTs will only increase the effort of sharing. As standard queuing theory teaches, when a system has not reached saturation, newly-arriving work can get in, use its portion of the resources, and get out efficiently. However, when resources are saturated, all newly-arriving work experiences delays equal to the time it takes someone else to finish their work. In the Teradata database, the impact of any delay due to saturation of resources may be aggravated in cases where a query has multiple steps, because there will be multiple places where a delay could be experienced.

In one particular implementation of the Teradata database, 80 (eighty) is selected as the maximum number of AWTs, to provide the best balance between AWT overhead and contention and CPU and I/O usage. Historically, 80 has worked well as a number that makes available a reasonable number of AWTs for all the different work types, and yet supports up to 40 or 50 new tasks per AMP comfortably. However, managing AWTs is not always a solution to increased demands on the DBS 100. In some cases, an increased demand on system resources may have an underlying cause, such that simply increasing the number of available AWTs may only serve to temporarily mask, or even worsen the demand on resources.

For example, one of the manifestations of resource exhaustion is a lengthening queue for processes waiting for AWTs. Therefore, performance may degrade coincident with a shortage of AWTs. However, this may not be directly attributable to the number of AWTs defined. In this case, adding AWTs will tend to aggravate, not reduce, performance issues.

Using all 80 AWTs in an on-going fashion is a symptom that resource usage is being sustained at a very demanding level. It is one of several signs that the platform may be running out of capacity. Adding AWTs may be treating the effect, but not helping to identify the cause of the performance problem. On the other hand, many Teradata database systems will reach 100% CPU utilization with significantly less than 50 active processes of the new work type. Some sites experience their peak throughput when 40 AWTs are in use servicing new work. By the time many systems are approaching the limit of 80 AWTs, they are already at maximum levels of CPU or I/O usage.

In the case where the number of AWTs is reaching their limit, it is likely that a lack of AWTs is merely a symptom of a deeper underlying problem or bottleneck. Therefore, it is necessary to carry out a more thorough investigation of all events in the DBS 100, in an attempt to find the true source of any slowdowns. For example, the underlying or "real" reason for an increase in CPU usage or an increase in the number of AWTs may be a hardware failure or an arrival rate surge.

Another issue that can impact system-wide performance is a workload event, such as the beginning or conclusion of a load or another maintenance job that can introduce locks or other delays into the DBS 100 or simply trigger the need to change the workload management scheme for the duration of the workload event. The DBS 100 provides a scheduled environment that manages priorities and other workload management controls in operating "windows" that trigger at certain times of the day, week, and/or month, or upon receipt of a workload event.

Figure 8:
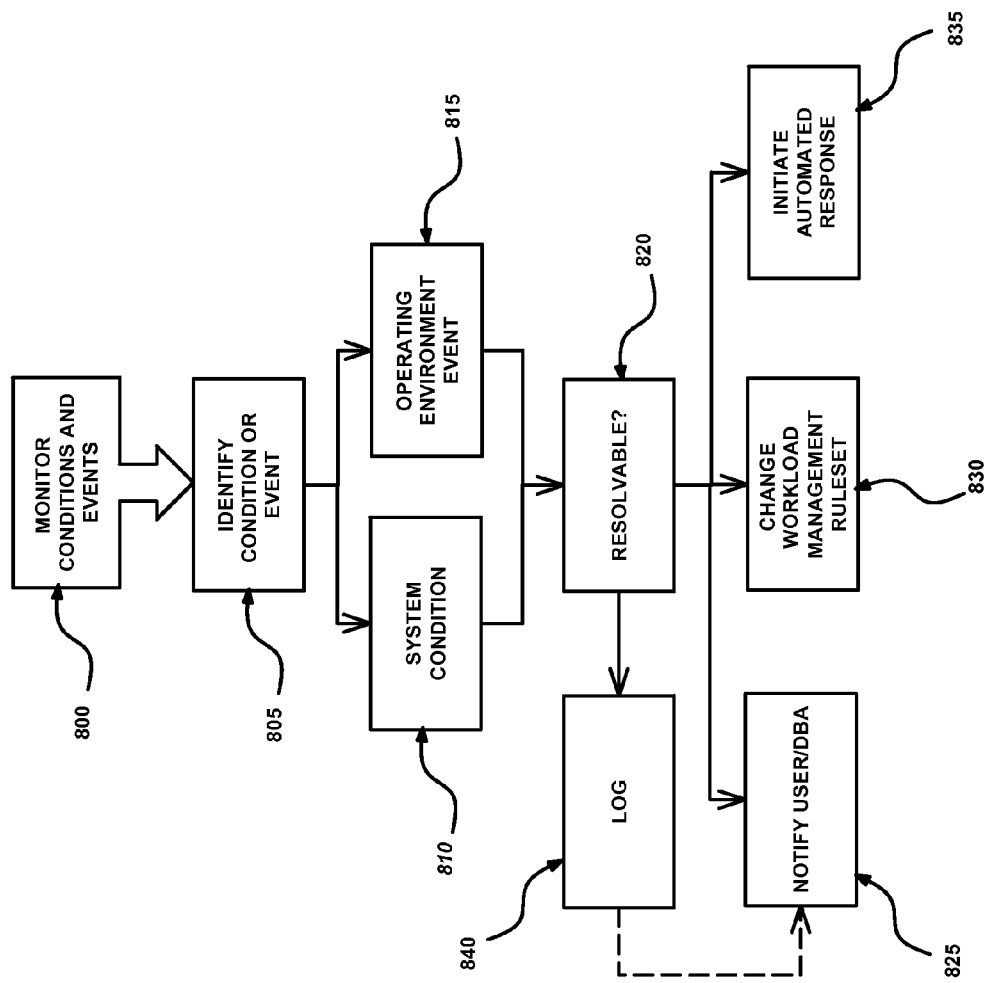
FIG. 8 is a flow chart of an event categorization and management system.

To manage workloads among these dynamic, system-wide situations, it is important to firstly classify the types of various system events that can occur in a DBS 100, in order to better understand the underlying causes of inadequate performance. As shown in FIG. 8, a plurality of conditions and events are monitored (block 800) and then identified (block 805) so that they can be classified into at least 2 general categories:
 1. System Conditions (block 810), i.e., system availability or performance conditions; and
 2. Operating Environment Events (block 815).

System Conditions 810 can include a system availability condition, such as a hardware component failure or recovery, or any other condition monitored by a TASM monitored queue. This may include a wide range of hardware conditions, from the physical degradation of hardware (e.g., the identification of bad sectors on a hard disk) to the inclusion of new hardware (e.g., hot swapping of CPUs, storage media, addition of I/O or network capabilities, etc). It can also include conditions external to the DBS 100 as relayed to the DBS 100 from the enterprise, such as an application server being down, or a dual/redundant system operating in degraded mode.

System Conditions 810 can also include a system performance condition, such as sustained resource usage, resource depletion, resource skew or missed Service Level Goals (SLGs).

An example of a system performance condition is the triggering of an action in response to an ongoing use (or non-use) of a system resource. For example, if there is low sustained CPU and IO for some qualifying time, then a schedule background task may be allowed to run. This can be achieved by lifting throttle limits, raising priority weights and/or other means. Correspondingly, if the system returns to a high sustained use of the CPU and IO, then the background task is reduced (e.g., terminated, priority weights lowered, throttle limits lowered, etc).

Another example of a system performance condition is where a condition is detected due to an increase in the time taken to process a given individual request or workload group. For example, if the average response time is greater than the SLG for a given time interval, then there may be an underlying system performance condition.

Yet another example may be a sudden increase in the number of AWTs invoked (as described earlier).

In other words, system performance conditions can include the following:
 1. Any sustained high or low usage of a resource, such as high CPU usage, high IO usage, a higher than average arrival rate, or a high concurrency rate;
 2. Any unusual resource depletion, such as running out of AWTs, problems with flow control, and unusually high memory usage;
 3. Any system skew, such as overuse of a particular CPU in a CPU cluster, or AWT overuse in a AWT cluster; and
 4. Missed SLGs.

The second type of detection is an Operating Environment Event 815. Such events can be predetermined or scheduled, in that a user or administrator of the system predefines the event at some point during the operation of the DBS 100. However, in some instances, Operating Environment Events 815 can occur without any appreciable notice being given to the DBS 100 or to users. The event may be time based, business event based or based on any other suitable criteria.

Operating Environment Events 815 can also be defined and associated with the beginning and completion of a particular application job. A user-defined event can be sent by the application and received by the DBS 100. This triggers the regulator of the DBS 100 to operate in the Rule Set's working values associated with this event. For example, the working values could direct the DBS 100 to give higher priority to workloads associated with month-end processing, or lower priority associated with workloads doing "regular" work, to enable throttles for non-critical work, and enable filters on workloads that interfere with month-end processing reporting consistency such as might happen when data is being updated while it is being reported on.

In another example, a user may define actions associated with the start of a daily load against a table X. This request triggers a phased set of actions:

1. Upon the "Begin Acquisition Phase" of MultiLoad to Table X;
    Promote the priority of all queries that involve table X;
    At the same time, restrict the ability for new queries involving table X from starting until after the data load is completed. Do this through delay, scheduling or disallowing the query upon request;
2. Upon completion of the acquisition phase and the beginning of the "Apply Phase", previously promoted queries that are still running are aborted ("Times Up!");
3. Upon completion of data load, lift restrictions on queries involving table X, and allow scheduled and delayed queries to resume.

Another example is to allow the user to define and automate Rule Set working value changes based on a user-event (rather than resource or time changes). For example, users may want resource allocation to change based on a business calendar that treats weekends and holidays differently from weekdays, and normal processing differently from quarterly or month-end processing.

As these events are generally driven by business or user considerations, and not necessarily by hardware or software considerations, they are difficult to predict in advance.

Thus, upon detection of any of System Conditions 810 or Operating Environments Events 815, one or more actions can be triggered. In this regard, Block 820 determines whether the detected System Conditions 810 or Operating Environments Events 815 are resolvable.

The action taken in response to the detection of a particular condition or event will vary depending on the type of condition or event detected. The automated action will fall into one of four broad categories (as shown in FIG. 8):

1. Notify (block 825);
2. Change the Workload Management Rule Set's Working Values (block 830);
3. Initiate an automated response (block 835); and
4. Log the event or condition, if the condition or event is not recognized (block 840).

Turning to the first possible automated action, the system may notify either a person or another software application/component including, users, the DBA, or a reporting application. Notification can be through one or more notification approaches:

Notification through a TASM event queue monitored by some other application (for example, "tell users to expect slow response times");

Notification through sending an Alert; and/or

Notification (including diagnostic drill-down) through automation execution of a program or a stored procedure.

Notification may be preferable where the system has no immediate way in which to ameliorate or rectify the condition, or where a user's expectation needs to be managed.

A second automated action type is to change the Workload Management Rule Set's working values.

Figure 9:
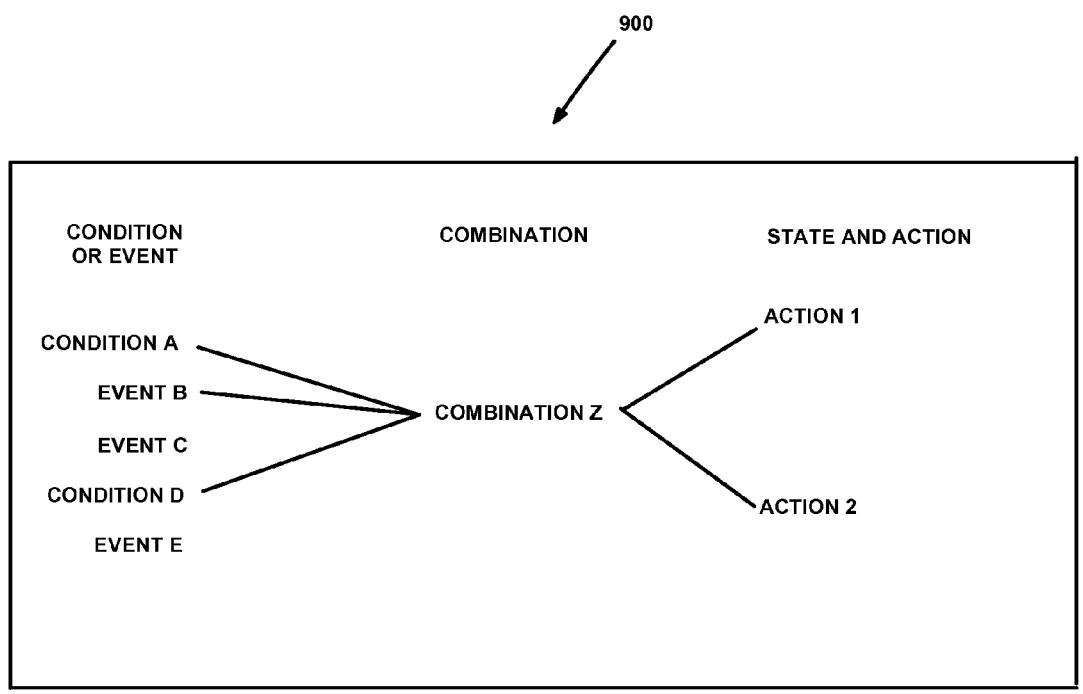
FIG. 9 illustrates how conditions and events may be comprised of individual conditions or events and condition or event combinations.

FIG. 9 illustrates how conditions and events may be comprised of individual conditions or events and condition or event combinations, which in turn cause the resulting actions.

The following is a table that represents kinds of conditions and events that can be detected.

| Class | Type | Description |
| --- | --- | --- |
| Operating Environment Event | (Time) Period | These are the current Periods representing intervals of time during the day, week, or month. The system monitors the system time, automatically causing an event when the period starts, and it will last until the period ends. |
| | User Defined (External)* | These are used to report anything that could conceivably change an operating environment, such as application events. They last until rescinded or optionally time out. |
| System Condition | Performance and Availability | DBS 100 components degrade or fail, or resources go below some threshold for some period of time. The system will do the monitoring of these events. Once detected, the system will keep the event in effect until the component is back up or the resource goes back above the threshold value for some minimal amount of time. |
| | User Defined (External)* | These are used to report anything that could conceivably change a system condition, such as dual system failures. They last until rescinded or optionally time out. |

Operating Environment Events and System Condition combinations are logical expressions of states. The simplest combinations are comprised of just one state. More complex combinations can be defined that combine multiple states with two or more levels of logical operators, for example, given four individual states, e1 through e4:

| Operator Levels | Logical Expression |
| --- | --- |
| 0 | e1 |
| 1 | e1 OR e2 |
| 1 | e1 AND e2 |
| 2 | (e1 OR e2) AND (e3 OR e4) |
| 2 | (e1 AND e2 AND (e3 OR e4)) |

Combinations cause one more actions when the logical expressions are evaluated to be "true." The following table outlines the kinds of actions that are supported.

| Type | Description |
| --- | --- |
| Alert | Use the alert capability to generate an alert. |
| Program | Execute a program to be named. |
| Queue Table | Write to a (well known) queue table. |
| SysCon | Change the System Condition. |
| OpEnv | Change the Operating Environment. |

Figure 10:
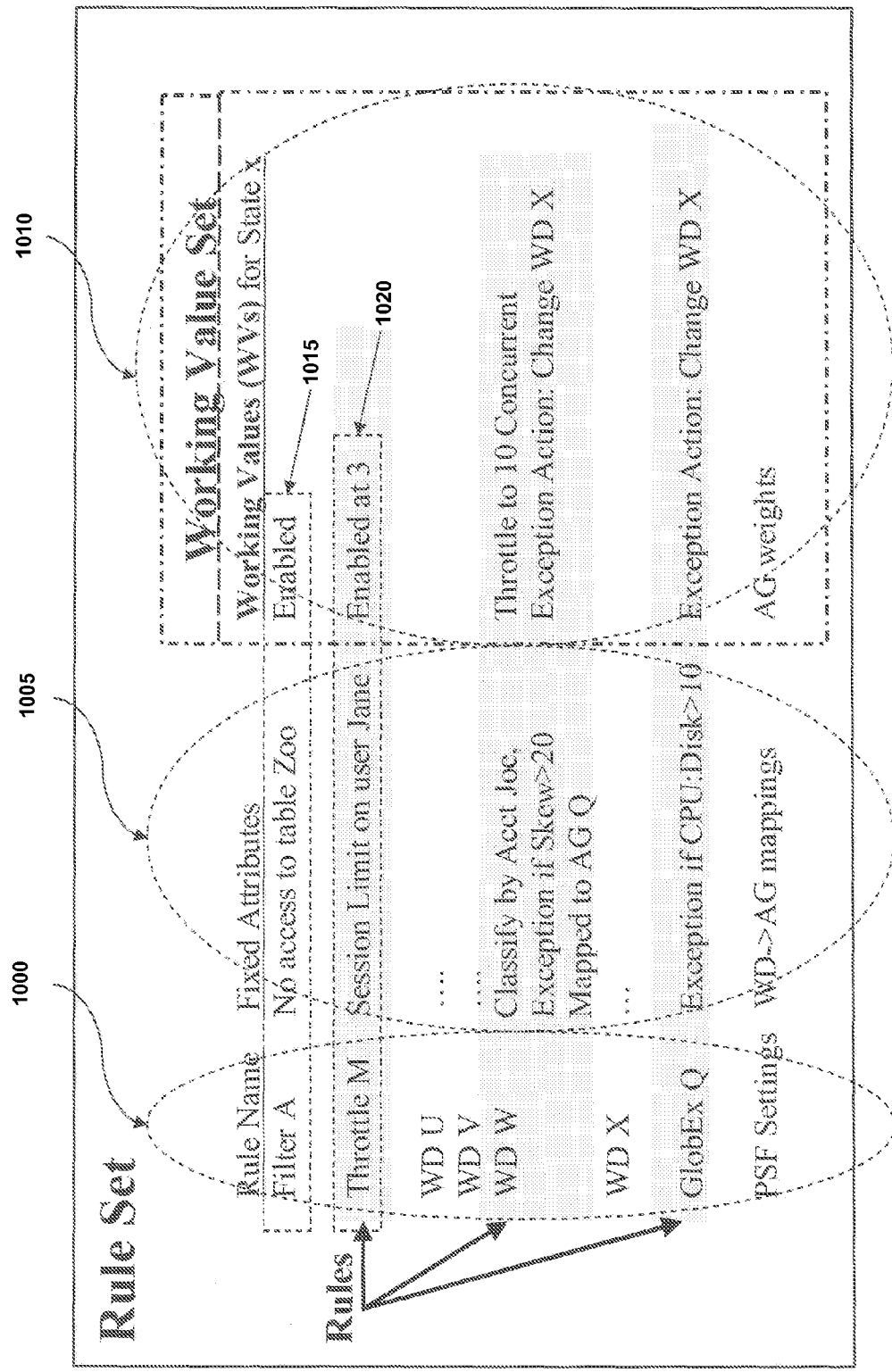
FIG. 10 is a table depicting an example rule set and working value set.

As shown in FIG. 10, the DBS 100 has a number of rules (in aggregation termed a Rule Set) which define the way in which the DBS 100 operates. The rules include a name (block 1000), attributes (block 1005), which describes what the rules do (e.g., session limit on user Jane) and working values (Wvs) (block 1010), which are flags or values that indicate whether the rule is active or not and the particular setting of the value. A set of all Wvs for all the rules contained in a Rule Set is called a "Working Value Set (WVS)."

A number of "states" can be defined, each state being associated with a particular WVS (i.e., a particular instance of a rule set). By swapping states, the working values of the workload management Rule Set are changed.

This process is best illustrated by a simple example. At FIG. 10, there is shown a particular WVS which, in the example, is associated with the State "X." State X, in the example, is a state that is invoked when the database is at almost peak capacity, Peak capacity, in the present example, is determined by detecting one of two events, namely that the arrival rate of jobs is greater than 50 per minute, or alternatively, that there is a sustained CPU usage of over 95% for 600 seconds. State X is designed to prevent resources being channeled to less urgent work. In State X, Filter A (block 1015), which denies access to table "Zoo" (which contains cold data and is therefore not required for urgent work), is enabled. Furthermore, Throttle M (block 1020), which limits the number of sessions to user "Jane" (a user who works in the marketing department, and therefore does not normally have urgent requests), is also enabled. State "X" is therefore skewed towards limiting the interaction that user Jane has with the DBS 100, and is also skewed towards limiting access to table Zoo, so that the DBS 100 can allocate resources to urgent tasks in preference to non-urgent tasks.

A second State "Y" (not shown) may also be created. In State "Y", the corresponding Rule Set disables filter "A", and increases Jane's session limit to 6 concurrent sessions. Therefore, State "Y" may only be invoked when resource usage falls below a predetermined level. Each state is predetermined (i.e., defined) beforehand by a DBA. Therefore, each Rule Set, working value set and state requires some input from a user or administrator that has some knowledge of the usage patterns of the DBS 100, knowledge of the data contained in the database, and perhaps even knowledge of the users. Knowledge of workloads, their importance, their characteristic is most likely required more so than the same understanding of individual rules. Of course, as a user defines workloads, most of that has already come to light, i.e., what users and requests are in a workload, how important or critical is the workload, etc. A third action type is to resolve the issue internally. Resolution by the DBS 100 is in some cases a better approach to resolving issues, as it does not require any input from a DBA or a user to define rules-based actions.

Resolution is achieved by implementing a set of internal rules which are activated on the basis of the event detected and the enforcement priority of the request along with other information gathered through the exception monitoring process.

Some examples of automated action which result in the automatic resolution of issues are given below. This list is not exhaustive and is merely illustrative of some types of resolution.

For the purposes of this example, it is assumed that the event that is detected is a longer than average response time (i.e., an exception monitor 615 detects that the response time SLG is continually exceed for a given time and percentage). The first step in launching an automated action is to determine whether an underlying cause can be identified.

For example, is the AWT pool the cause of the longer than average response time? This is determined by seeing how many AWTs are being used. If the number of idle or inactive AWTs is very low, the AWT pool is automatically increased to the maximum allowed (normally 80 in a typical Teradata system).

The SLG is then monitored to determine whether the issue has been ameliorated. When the SLG is satisfactory for a qualifying time, the AWT poolsize is progressively decreased until a suitable workable value is found.

However, the AWT pool may not be the cause of the event. Through the measuring of various system performance indicators, it may be found that the Arrival Rate is the cause of decreased performance. Therefore, rather than limiting on concurrency, the DBS 100 can use this information to take the action of limiting the arrival rate (i.e., throttle back the arrival rate to a defined level, rather than allowing queries to arrive at unlimited rates). This provides an added ability to control the volume of work accepted per workload group definition.

Alternatively, there may be some workload group definitions at the same or lower enforcement exceeding their anticipated arrival rates by some qualifying time and amount. This is determined by reviewing the anticipated arrival rate as defined by the SLG.

If there are workload group definitions at the same or lower enforcement exceeding their anticipated arrival rates, their concurrency level is decreased to a minimum lower limit.

The SLG is then monitored, and when the SLG returns to a satisfactory level for a qualifying time, the concurrency level is increased to a defined normal level (or eliminated if no concurrency level was defined originally).

If the event cannot be easily identified or categorized by the DBS 100, then the event is simply logged as a "un-resolvable" problem. This provides information which can be studied at a later date by a user and/or DBA, with a view to identifying new and systemic problems previously unknown.

The embodiment described herein, through a mixture of detection and management techniques, seeks to correctly manage users' expectations and concurrently smooth the peaks and valleys of usage. Simply being aware of the current or projected usage of the DBS 100 may be a viable solution to smoothing peaks and valleys of usage. For example, if a user knows that he needs to run a particular report "sometime today," he may avoid a high usage (and slow response) time in the morning in favor of a lower usage time in the afternoon. Moreover, if the work cannot be delayed, insight into DBS 100 usage can, at the very least, help set reasonable expectations.

Moreover, the predetermined response to events, through the invocation of different "states" (i.e., changes in the Rule Set's working values) can also assist in smoothing peaks and valleys of usage. The embodiment described herein additionally seeks to manage automatically to better meet SLGs, in light of extenuating circumstances such as hardware failures, enterprise issues and business conditions.

However, automated workload management needs to act differently depending on what states are active on the system at any given time. Each unique combination of conditions and events could constitute a unique state with unique automated actions. Given a myriad of possible condition and event types and associated values, a combinatorial explosion of possible states can exist, making rule-based automated workload management a very daunting and error-prone task. For example, given just 15 different condition and event types that get monitored, each with a simple on or off value, there can be as many as $2^{15}=32,768$ possible combinations of states. This number only increases as the number of unique condition and event types or the possible values of each monitored condition or event type increases.

A DBA managing the rules-based management system, after identifying each of these many states must also to designate a unique action for each state. The DBA would further need to associate priority to each state such that if more than one state were active at a given time, the automated workload management scheme would know which action takes precedence if the actions conflict. In general, the DBA would find these tasks overwhelming or even impossible, as it is extremely difficult to manage such an environment.

To solve this problem associated with automated workload management, or any rule-driven system in general, the system includes an n-dimensional matrix to tame the combinatorial explosion of states and to provide a simpler perspective to the rules-based environment. Choosing two or more well-known key dimensions provides a perspective that guides the DBA to know whether or not he has identified all the important combinations, and minimizes the number of unique actions required when various combinations occur. Given that n<total possible event types that can be active, each unique event or event combination is collapsed into a finite number of one of the n-dimension elements.

Figure 11:
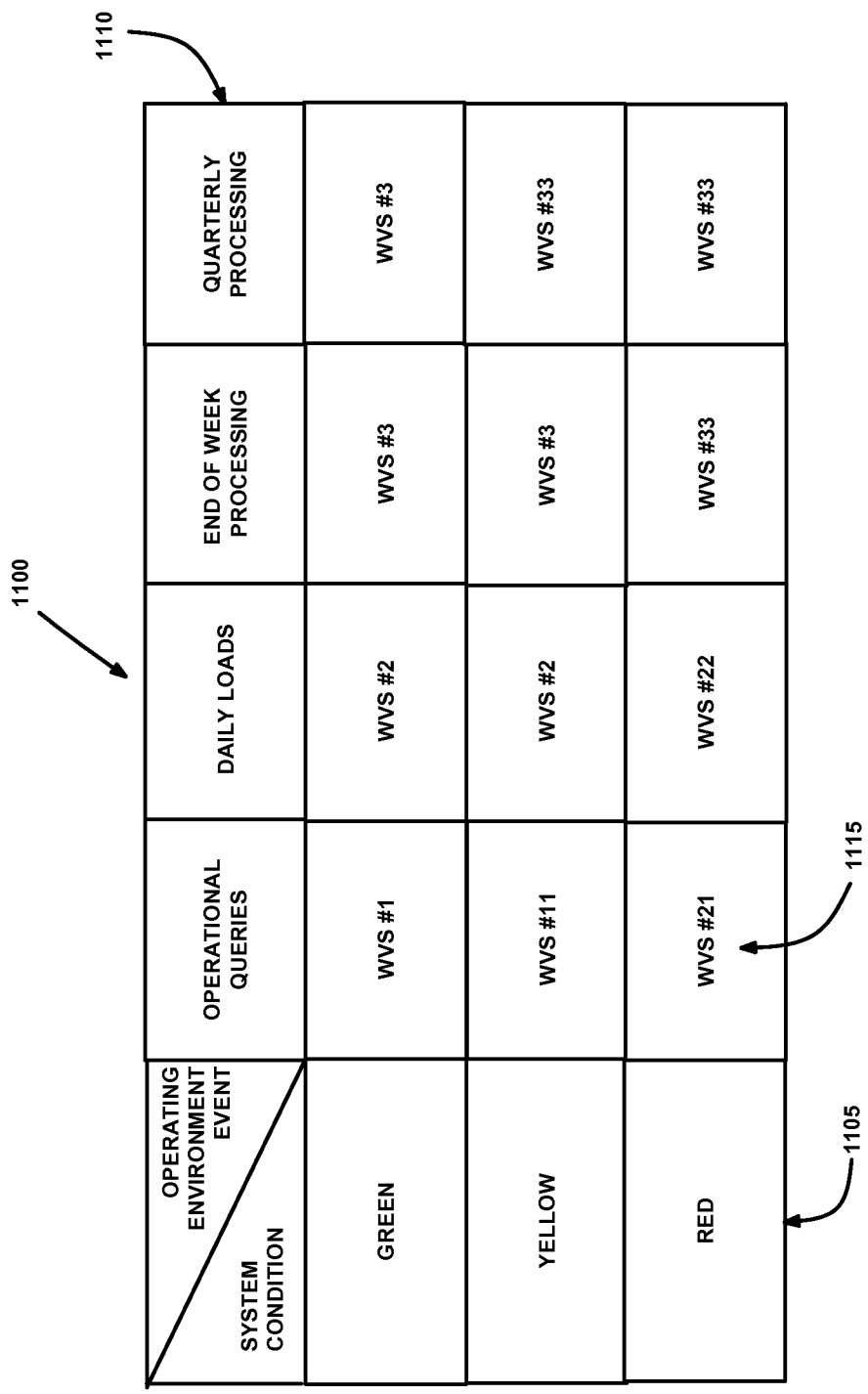
FIG. 11 illustrates an n-dimensional matrix that is used to perform with automated workload management.

In one embodiment, for example, as shown in FIG. 11, a two-dimensional State Matrix 1100 may be used, wherein the first dimension 1105 represents the System Condition (SysCon) and the second dimension 1110 represents the Operating Environment Events (OpEnv). As noted above, System Conditions 1105 represent the "condition" or "health" of the system, e.g., degraded to the "red" system condition because a node is down, while Operating Environment Events 1110 represent the "kind of work" that the system is being expected to perform, e.g., within an Interactive or Batch operational environment, wherein Interactive takes precedence over Batch.

Each element 1115 of the State Matrix 1100 is a <SysCon, OpEnv> pair that references a workload management state, which in turn invokes a single WVS instance of the workload management Rule Set. Multiple State Matrix 1100 elements may reference a common state and thus invoke the same WVS instance of the workload management Rule Set. However, only one state is in effect at any given time, based on the State Matrix 1100 element 1115 referenced by the highest SysCon severity and the highest OpEnv precedence in effect. On the other hand, a System Condition, Operating Environment Event, or state can change as specified by directives defined by the DBA. One of the main benefits of the State Matrix 1100 is that the DBA does not specify a state change directly, but must do so indirectly through directives that change the SysCon or OpEnv.

When a particular condition or event combination is evaluated to be true, it is mapped to one of the elements 1115 of one of the dimensions of the State Matrix 1100. For example, given the condition "if AMP Worker Tasks available is less than 3 and Workload X's Concurrency is greater than 100" is "true," it may map to the System Condition of RED. In another example, an event of "Monday through Friday between 7 AM and 6 PM" when "true" would map to the Operating Environment Event of OPERATIONAL_QUERIES.

The combination of <RED, OPERATIONAL_QUERIES>, per the corresponding State Matrix 1100 element 1115, maps to a specific workload management state, which in turn invokes the WVS instance of the workload management Rule Set named WVS#21. Unspecified combinations would map to a default System Condition and a default Operating Environment.

Further, a state identified in one element 1115 of the State Matrix 1100 can be repeated in another element 1115 of the State Matrix 1100. For example, in FIG. 11, WVS#33 is the chosen workload management rule when the <SysCon, OpEnv> pair is any of: <RED, QUARTERLY_PROCESSING>, <YELLOW, QUARTERLY_PROCESSING> or <RED, END_OF_WEEK_PROCESSING>.

The effect of all this is that the State Matrix 1100 manages all possible states. In the example of FIG. 11, 12 event combinations comprise $2^{12}$=4096 possible states. However, the 2-dimensional State Matrix 1100 of FIG. 11, with 3 System Conditions and 4 Operating Environment Events, yields at the most 4×3=12 states, although less than 12 states may be used because of the ability to share states among different <SysCon, OpEnv> pairs in the State Matrix 1100.

In addition to managing the number of states, the State Matrix 1100 facilitates conflict resolution through prioritization of its dimensions, such that the system conditions' positions and operating environment events' positions within the State Matrix 1100 indicate their precedence.

Suppose that more than one condition or event combination were true at any given time. Without the State Matrix 1100, a list of 4096 possible states would need to be prioritized by the DBA to determine which workload management rules should be implemented, which would be a daunting task. The State Matrix 1100 greatly diminishes this challenge through the prioritization of each dimension.

For example, the values of the System Condition dimension are Green, Yellow and Red, wherein Yellow is more severe, or has higher precedence over Green, and Red is more severe or has higher precedence over Yellow as well as Green. If two condition and event combinations were to evaluate as "true" at the same time, one thereby mapping to Yellow and the other mapping to Red, the condition and event combination associated with Red would have precedence over the condition and event combination associated with Yellow.

Consider the following examples. In a first example, there may be a conflict resolution in the System Condition dimension between "Red," which has precedence (e.g., is more "severe") over "Yellow." If a node is down/migrated, then a "Red" System Condition exists. If a dual system is down, then a "Yellow" System Condition exists. If a node is down/migrated and a dual system is down, then the "Red" System Condition has precedence.

In a second example, there may be a conflict resolution in the Operating Environment Event dimension between a "Daily Loads" event, which has precedence over "Operational Queries" events. At 8 AM, the Operating Environment Event may trigger the "Operational Queries" event. However, if loads are running, then the Operating Environment Event may also trigger the "Daily Loads" event. If it is 8 AM and the loads are still running, then the "Daily Loads" Operating Environment Event takes precedence.

Once detected, it is the general case that a condition or event status is remembered (persists) until the status is changed or reset. However, conditions or events may have expiration times, such as for user-defined conditions and events, for situations where the status fails to reset once the condition or event changes. Moreover, conditions or events may have qualification times that require the state be sustained for some period of time, to avoid thrashing situations. Finally, conditions or events may have minimum and maximum duration times to avoid frequent or infrequent state changes.

Thus, the State Matrix 1100 has a number of advantages. The State Matrix 1100 introduces simplicity for the vast majority of user scenarios by preventing an explosion in state handing through a simple, understandable n-dimensional matrix. To maintain this simplicity, best practices will guide the system operator to fewer rather than many SysCon and OpEnv values. It also maintains master control of WVS on the system, but can also support very complex scenarios. In addition, the State Matrix 1100 can alternatively support an external "enterprise" master through user-defined functions and notifications. Finally, the State Matrix 1100 is intended to provide extra dimensions of system management using rules at the workload group definition level with a dynamic regulator.

A key point of the State Matrix 1100 is that by limiting actions to only change SysCon or OpEnv (and not states, or individual rules, or rules' WVS's), master control is contained in a single place, and avoids having too many entities asserting control. For example, without this, a user might change the individual weight of one workload to give it highest priority, without understanding the impact this has on other workloads. Another user might change the priority of another workload to be even higher, such that they overwrite the intentions of the first user. Then, the DBS 100 internally might have done yet different things. By funneling all actions to be associated with a SysCon or OpEnv instead of directed to individual rules in the Rule Set, or directly to a state as a whole, the DBS 100 avoids what could be chaos in the various events. Consequently, in the present invention, the WVS's are changed as a whole (since some settings must really be made in light of all workloads, not a single workload or other rule), and by changing just SysCon or OpEnv, in combination with precedence, conflict resolution is maintained at the State Matrix 1100.

Note that the State Matrix 1100 may be used by a single regulator 415 controlling a single DBS 100, or a plurality of State Matrices 1100 may be used by a plurality of regulators 415 controlling a plurality of DBS 100. Moreover, a single State Matrix 1100 may be used with a plurality of regulators 415 controlling a plurality of DBS 100, wherein the single State Matrix 1100 is a domain-level State Matrix 1100 used by a domain-level "virtual" regulator.

Figure 12:
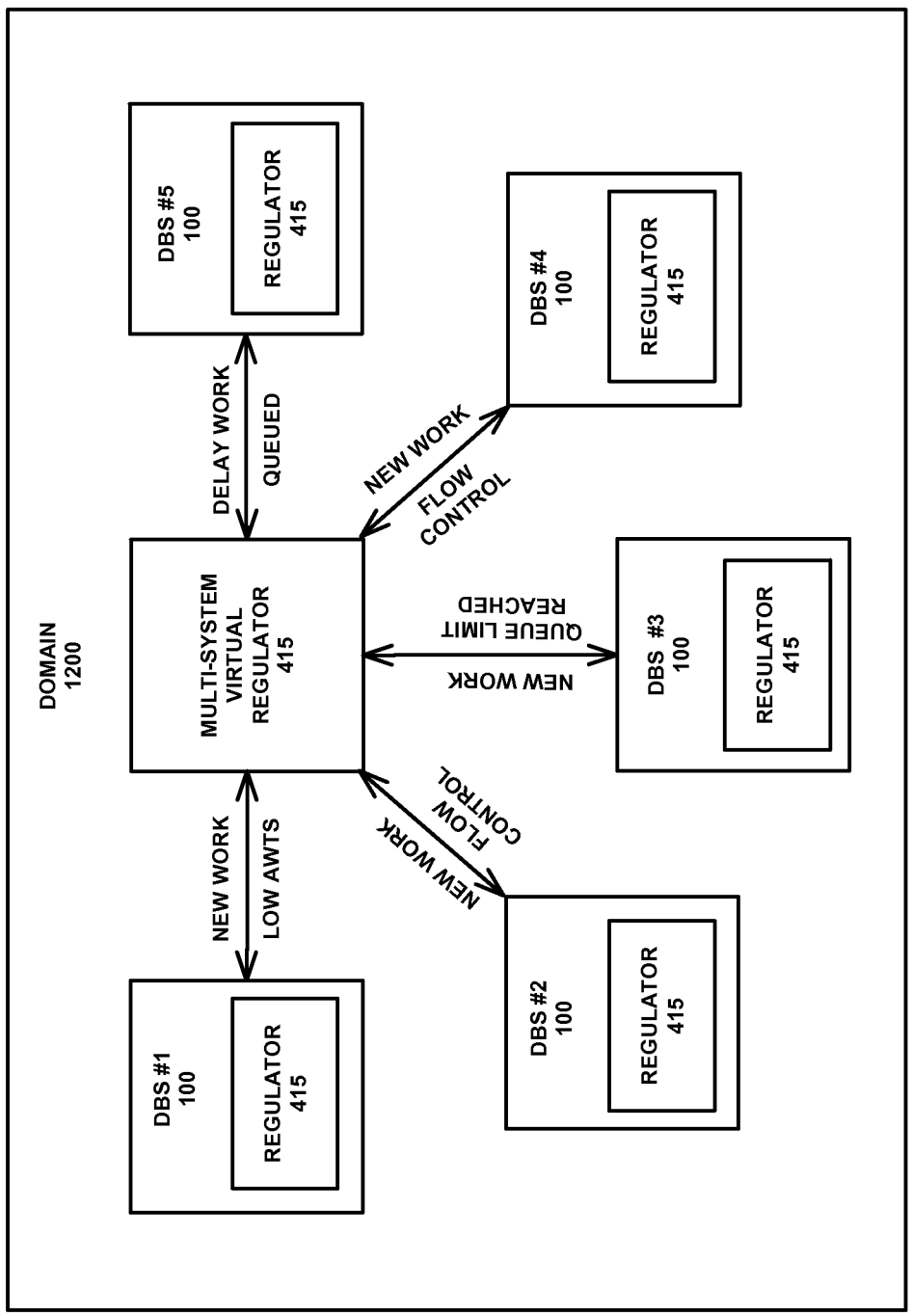
FIG. 12 illustrates a multi-system environment including a domain-level virtual regulator and a plurality of system-level regulators.

FIG. 12 illustrates an embodiment where a plurality of regulators 415 exist in a domain 1200 comprised of a plurality of dual-active DBS 100, wherein each of the dual-active DBS 100 is managed by one or more regulators 415 and the domain 1200 is managed by one or more multi-system "virtual" regulators 415.

Managing system resources on the basis of individual systems and requests does not, in general, satisfactorily manage complex workloads and SLGs across a domain 1200 in a multi-system environment. To automatically achieve workload goals in a multi-system environment, performance goals must first be defined (administered), then managed (regulated), and finally monitored across the entire domain 1200 (set of systems participating in an n-system environment).

Regulators 415 are used to manage workloads on an individual DBS 100 basis. A virtual regulator 415 comprises a modified regulator 415 implemented to enhance the closed-loop system management (CLSM) architecture in a domain 1200. That is, by extending the functionality of the regulator 415 components, complex workloads are manageable across a domain 1200.

The function of the virtual regulator 415 is to control and manage workloads across all DBS 100 in a domain 1200. The functionality of the virtual regulator 415 extends the existing goal-oriented workload management infrastructure, which is capable of managing various types of workloads encountered during processing.

In one embodiment, the virtual regulator 415 includes a "thin" version of a DBS 100, where the "thin" DBS 100 is a DBS 100 executing in an emulation mode, such as described in U.S. Pat. Nos. 6,738,756, 7,155,428, 6,801,903 and 7,089,258, all of which are incorporated by reference herein. A query optimizer function 320 of the "thin" DBS 100 allows the virtual regulator 415 to classify received queries into "who, what, where" classification criteria, and allows a workload query manager 610 of the "thin" DBS 100 to perform the actual routing of the queries among multiple DBS 100 in the domain 1200. In addition, the use of the "thin" DBS 100 in the virtual regulator 415 provides a scalable architecture, open application programming interfaces (APIs), external stored procedures (XSPs), user defined functions (UDFs), message queuing, logging capabilities, rules engines, etc.

The virtual regulator 415 also includes a set of open APIs, known as "Traffic Cop" APIs, that provide the virtual regulator 415 with the ability to monitor DBS 100 states, to obtain DBS 100 status and conditions, to activate inactive DBS 100, to deactivate active DBS 100, to set workload groups, to delay queries (i.e., to control or throttle throughput), to reject queries (i.e., to filter queries), to summarize data and statistics, to create DBQL log entries, run a program (stored procedures, external stored procedures, UDFs, etc.), to send messages to queue tables (Push, Pop Queues), and to create dynamic operating rules. The Traffic Cop APIs are also made available to all of the regulators 415 for each DBS 100, thereby allowing the regulators 415 for each DBS 100 and the virtual regulator 415 for the domain 1200 to communicate this information between themselves.

Specifically, the virtual regulator 415 performs the following functions: (a) Regulate (adjust) system conditions (resources, settings, PSF weights, etc.) against workload expectations (SLGs) across the domain 1200, and to direct query traffic to any of the DBS 100 via a set of predefined rules. (b) Monitor and manage system conditions across the domain 1200, including adjusting or regulating response time requirements by DBS 100, as well as using the Traffic Cop APIs to handle filter, throttle and/or dynamic allocation of resource weights within DBS 100 and partitions so as to meet SLGs across the domain 1200. (c) Raise an alert to a DBA for manual handling (e.g., defer or execute query, recommendation, etc.) (d) Cross-compare workload response time histories (via a query log) with workload SLGs across the domain 1200 to determine if query gating (i.e., flow control) through altered Traffic Cop API settings presents feasible opportunities for the workload. (e) Manage and monitor the regulators 415 across the domain 1200 using the Traffic Cop APIs, so as to avoid missing SLGs on currently executing workloads, or to allow workloads to execute the queries while missing SLGs by some predefined or proportional percentage based on shortage of resources (i.e., based on predefined rules). (f) Route queries (traffic) to one or more available DBS 100.

Although FIG. 12 depicts an implementation using a single virtual regulator 415 for the entire domain 1200, in some exemplary environments, one or more backup virtual regulators 415 are also provided for circumstances where the primary virtual regulator 415 malfunctions or is otherwise unavailable. Such backup virtual regulators 415 may be active at all times or may remain dormant until needed.

In some embodiments, each regulator 415 communicates its System Conditions and Operating Environment Events directly to the virtual regulator 415. The virtual regulator 415 compiles the information, adds domain 1200 or additional system level information, to the extent there is any, and makes its adjustments based on the resulting set of information.

In other embodiments, each regulator 415 may have super-ordinate and/or subordinate regulators 415. In such embodiments, each regulator 415 gathers information related to its own System Conditions and Operating Environment Events, as well as that of its children regulators 415, and reports the aggregated information to its parent regulator 415 or the virtual regulator 415 at the highest level of the domain 1200.

When the virtual regulator 415 compiles its information with that which is reported by all of the regulators 415, it will have complete information for domain 1200. The virtual regulator 415 analyzes the aggregated information to apply rules and make adjustments.

The virtual regulator 415 receives information concerning the states, events and conditions from the regulators 415, and compares these states, events and conditions to the SLGs. In response, the virtual regulator 415 adjusts the operational characteristics of the various DBS 100 through the set of "Traffic Cop" Open APIs to better address the states, events and conditions of the DBS 100 throughout the domain 1200.

Generally speaking, regulators 415 provide real-time closed-loop system management over resources within the DBS 100, with the loop having a fairly narrow bandwidth, typically on the order of milliseconds, seconds, or minutes. The virtual regulator 415, on the other hand, provides real-time closed-loop system management over resources within the domain 1200, with the loop having a much larger bandwidth, typically on the order of minutes, hours, or days.

Further, while the regulators 415 control resources within the DBS's 100, and the virtual regulator 415 controls resources across the domain 1200, in many cases, DBS 100 resources and domain 1200 resources are the same. The virtual regulator 415 has a higher level view of resources within the domain 1200, because it is aware of the state of resources of all DBS 100, while each regulator 415 is generally only aware of the state of resources within its own DBS 100.

There are a number of techniques by which virtual regulator 415 implements its adjustments to the allocation of system resources. For example, and as illustrated in FIG. 12, the virtual regulator 415 communicates adjustments directly to the regulators 415 for each DBS 100, and the regulators 415 for each DBS 100 then apply the relevant rule adjustments. Alternatively, the virtual regulator 415 communicates adjustments to the regulators 415 for each DBS 100, which then passes them on to other, e.g., subordinate, regulators 415 in other DBS 100. In either case, the regulators 415 in each DBS 100 incorporate adjustments communicated by the virtual regulator 415.

Given that the virtual regulator 415 has access to the state, event and condition information from all DBS 100, it can make adjustments that are mindful of meeting SLGs for various workload groups. It is capable of, for example, adjusting the resources allocated to a particular workload group on a domain 1200 basis, to make sure that the SLGs for that workload group are met. It is further able to identify bottlenecks in performance and allocate resources to alleviate the bottlenecks. Also, it selectively deprives resources from a workload group that is idling resources. In general, the virtual regulator 415 provides a domain 415 view of workload administration, while the regulators 415 in each DBS 100 provide a system view of workload administration.

The system also provides for dynamic query routing between DBS 100 in the domain 1200 based on System Conditions and Operating Environment Events. In the domain 1200, the DBS 100 to which a query will be routed can be chosen by the virtual regulator 415; in a single DBS 100, there is no choice and the associated regulator 415 for that DBS 100 routes only within that DBS 100.

This element of choice can be leveraged to make intelligent decisions regarding query routing that are based on the dynamic state of the constituent DBS 100 within the domain 1200. Routing can be based any System Conditions or Operating Environment Events that are viewed as pertinent to workload management and query routing. This solution thus leverages and provides a run-time resource sensitive and data driven optimization of query execution.

In one embodiment, the System Conditions or Operating Environment Events may comprise:
  Performance conditions, such as:
    Flow control,
    AWT exhaustion, or
    Low memory.
  Availability indicators, such as:
    Performance continuity situation,
    System health indicator,
    Degraded disk devices,
    Degraded controllers,
    Node, parsing engine (PE), access module processor (AMP), gateway (GTW) or interconnect (BYNET) down,
    Running in fallback.
  Resource utilization (the Optimizer 320 bias can be set to favor plans that will use less of the busy resources), such as:
    Balanced,
    CPU intensive or under-utilized,
    Disk I/O intensive or under-utilized, or
    File system intensive or under-utilized.
  User or DBA defined conditions or events, or user-defined events.
  Time periods (calendar).

Routing can be based on combinations of the System Conditions and Operating Environment Events described above. As noted in the State Matrix 1100, associated with each condition, event or combination of conditions and events can be a WVS instance of a workload management Rule Set. Some of the possible rules are:
  Do not route to system X under this condition, event or combination of conditions and events.
  Increase Optimizer 320 run time estimate for system X by Y % of prior to routing decision.
  Use Optimizer 320 bias factors to determine Optimizer 320 estimates prior to routing decision.
  Decrease load on system X by routing only Y % of queries that would normally be routed to system X.

Such a structure adds to the value proposition of a multi-system environment by leveraging query routing choices and making intelligent choices of query routing based on System Conditions and Operating Environment Events.

The system also provides for dynamic query and step routing between DBS's 100 tuned for different objectives. Consider that a data warehouse version of the DBS 100 may be tuned to perform well on a particular workload, but that same tuning may not be optimal for another workload. In a single DBS 100, tuning choices must be made that trade-off the performance of multiple workloads. Example workloads would include batch loading, high volume SQL oriented inserts/updates, decision support and tactical queries.

The system also provides a solution that allows a domain 1200 to be tuned for multiple objectives with few or lesser trade-offs. Specifically, the present invention enables tuning of each constituent DBS 100 (within a domain 1200) differently and routes queries or steps of queries to DBS's 100 based on cost estimates of the more efficient DBS 100. In the case of per step routing, step cross-overs between DBS's 100 (the cost of a first step performed on a first DBS 100 and a second step performed on a second DBS 100) are also costed, in order determine a low cost plan.

In one embodiment, cost functions of each DBS 100 are used to determine routing. Specifically, the cost functions provide estimated cost information that is used in the determining how to route a request, based on which DBS 100 can meet the SLG. Since each DBS 100 may be tuned differently, the cost function may be utilized to determine which DBS 100 should be used for a particular query or query step.

The system also provides for dynamic query optimization, wherein System Conditions and Operating Environment Events are considered when determining an optimal query execution plan. For example, the Optimizer 320 may be a cost-based query optimizer that considers a large number of candidate plans, and selects one for execution, as described, for example, in U.S. Utility patent application Ser. No. 10/730,629, by Douglas P. Brown and Bhashyam Ramesh, and entitled Closed-Loop Estimation of Request Costs; and U.S. Utility patent application Ser. No. 11/328,702, filed Jan. 10, 2006, by Douglas P. Brown, Anita Richards, and Bhashyam Ramesh, and entitled Closed-Loop Predicate Analysis; both of which applications are incorporated by reference herein.

Typically, the choice of an execution plan is the result of various interacting factors, such as cost functions, database statistics, etc. For normal operational systems, the Optimizer 320 does a good job of generating a reasonable set of plans. However, external, system-wide or domain-wide System Conditions and Operating Environment Events can influence the generation, selection and execution of query execution plans.

FIG. 13 illustrates an embodiment where the TASM mechanism is used by the Optimizer 320 to dynamically optimize database queries based on system state information. Specifically, System Conditions (SysCons) and Operating Environment Events (OpEnvs) are monitored during operation of the computer system by the Optimizer 320 using the Traffic Cop APIs, an n-dimensional Optimizer Matrix 1300 is used by the Optimizer 320 to identify at least one rule resulting from the monitored System Conditions and Operating Environment Events, and then an optimal query execution plan is selected by the Optimizer 320 from among a plurality of query execution plans generated for the query in response to the identified rule. Using the Optimizer Matrix 1300, a DBA has the ability to specify different behaviors depending on the current situation.

Similar to the State Matrix 1100 illustrated in FIG. 11, the Optimizer Matrix 1300 includes rows 1305 that represent different System Conditions (in this example, the System Condition is a system state, such as Green, Yellow and Red states), and columns 1310 that represent different Operating Environment Events (in this example, the Operating Environment Event is an access method or a join method performed by the query execution plan, such as Product Join, Merge Join, Local Nested Join and Hash Join methods). Each of the cells 1315 in the Optimizer Matrix 1300, at the intersection of a particular row 1305 and column 1310, represents a rule used by the Optimizer 320 in the selection of the optimal query execution plan. Note that each row 1305, column 1310 and cell 1315 is predetermined (i.e. defined beforehand) by a user or administrator who has some knowledge of the usage patterns of the DBS 100, knowledge of the data contained in the database, and perhaps even knowledge of the users submitting the requests.

In the example of FIG. 13, the rules shown in the cells 1315 of the Optimizer Matrix 1300 comprise "Enforcement Priority" rules, and are labeled as High, Medium, Low, None, Tactical and Background priorities, in their weighted order of priority. High, Medium, Low rules merely indicate relative priorities, while None, Tactical and Background rules indicate both relative priorities and special handling. For example, the "None" rule indicates that the corresponding access or join method should not be executed, the "Tactical" rule indicates that the corresponding access or join method should be executed only to solve a specific problem, and the "Background" rule indicates that the corresponding access or join method should be executed only as a background task (e.g., only when no other tasks are executing).

In the example of FIG. 13, the intersection of specific rows 1305 and columns 1310 map to specific cells 1315 within the Optimizer Matrix 1300 representing specific rules. For the state of "Green," Product Joins, Merge Joins, Local Nested Joins, and Hash Joins are all considered to be of "High" importance. For the state of "Yellow," Product Joins are considered to be of "Medium" importance, Merge Joins are considered to be of "Tactical" importance, Local Nested Joins are considered to be of "High" importance, and Hash Joins are considered to be of "Low" importance. For the state of "Red," Product Joins are considered to be of "Background" importance, Merge Joins are considered to be of "Tactical" importance, Local Nested Joins are considered to be of "Medium" importance, and Hash Joins are considered to be of "No" importance (e.g., none allowed).

The Optimizer 320 generates and selects query execution plans based on these different rules. Specifically, each rule provides a heuristic that is used when computing the cost of performing a query execution plan that includes the corresponding access or join method. In one embodiment, the heuristic comprises actual cost information, and the actual cost information comprises a weight, so that a cost value can be computed for each of the query execution plans using the actual cost information, and the optimal query execution plan can be selected based on the computed cost value.

Figure 14:
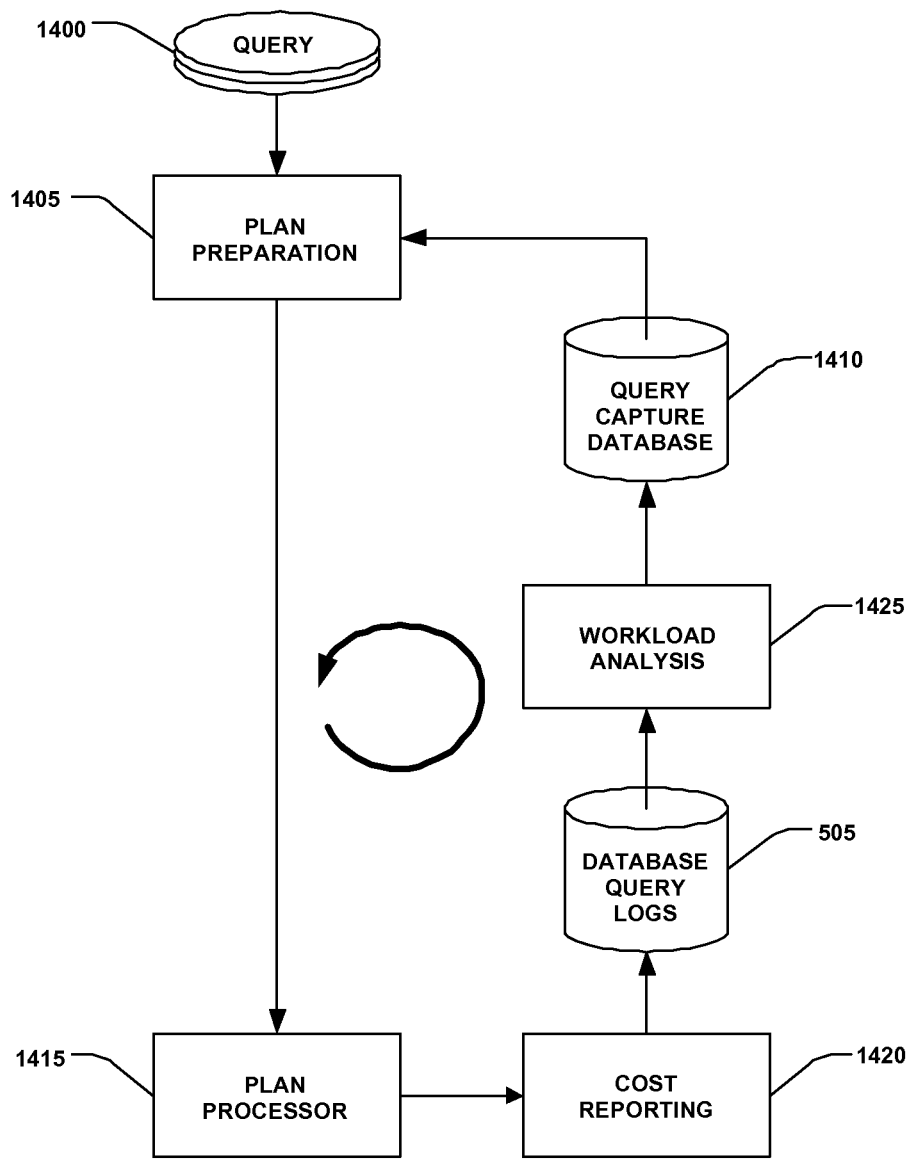
FIG. 14 is a flowchart illustrating the query optimization steps performed using the n-dimensional matrix comprised of system conditions and operating environment events.

This is generally illustrated in FIG. 14, which shows the DBS 100 using actual costs to improve the operation of the Optimizer 320. In this manner, the present invention extends the functionality performed by the Optimizer 320 as described in: U.S. Utility patent application Ser. No. 10/730,629, by Douglas P. Brown and Bhashyam Ramesh, and entitled Closed-Loop Estimation of Request Costs; and U.S. patent application Ser. No. 11/328,702, filed Jan. 10, 2006, by Douglas P. Brown, Anita Richards, and Bhashyam Ramesh, and entitled Closed-Loop Predicate Analysis; both of which applications are incorporated by reference herein.

In FIG. 14, a query request 1400 is presented for plan preparation (block 1405), wherein the query is analyzed to identify its associated predicates and the predicates are analyzed to identify their access paths. The plan preparation 1405 generates one or more query execution plans for each of the predicates and their associated access paths. The plan preparation 1405 then computes a total cost for each of the query execution plans using estimated cost information (optionally) adjusted by actual cost information (if any) stored in a query capture database (QCD) 1410, as described in more detail below. Note that this adjustment may be invoked for all query execution plans or it may be invoked more selectively for only some of the query execution plans.

The plans are presented to a plan processor (block 1415), which selects an optimal query execution plan for each predicate from among the available query execution plans for each predicate, based on predetermined criteria such as the computed total cost. The plan processor 1415 then executes the optimal query execution plan and collects the actual cost information as the optimal query execution plan is executed.

Block 1420 represents the storing of the actual cost information in the database query logs 505. The actual cost information is then analyzed (block 1425) and stored in the QCD 1410. Thereafter, the actual cost information is available for use by the plan preparation 1405 in determining the cost of performing the identified plans. Thus, as shown by the arrowed circle in FIG. 14, the processing of query requests forms a feedback loop.

The Optimizer 320 can be extended even further to perform certain aspects of optimization in real-time during query runtime. For example, the Optimizer 320 is in a much better position to choose an efficient plan when actual results are known. Such re-optimization can produce large gains in performance. However, new methods and tools are needed for such query plan analysis and optimization. For example, there are large costs associated with run-time query plan analysis, especially in capturing and storing internal data structures of the Optimizer 320 for later use during re-optimization.

Figure 15:
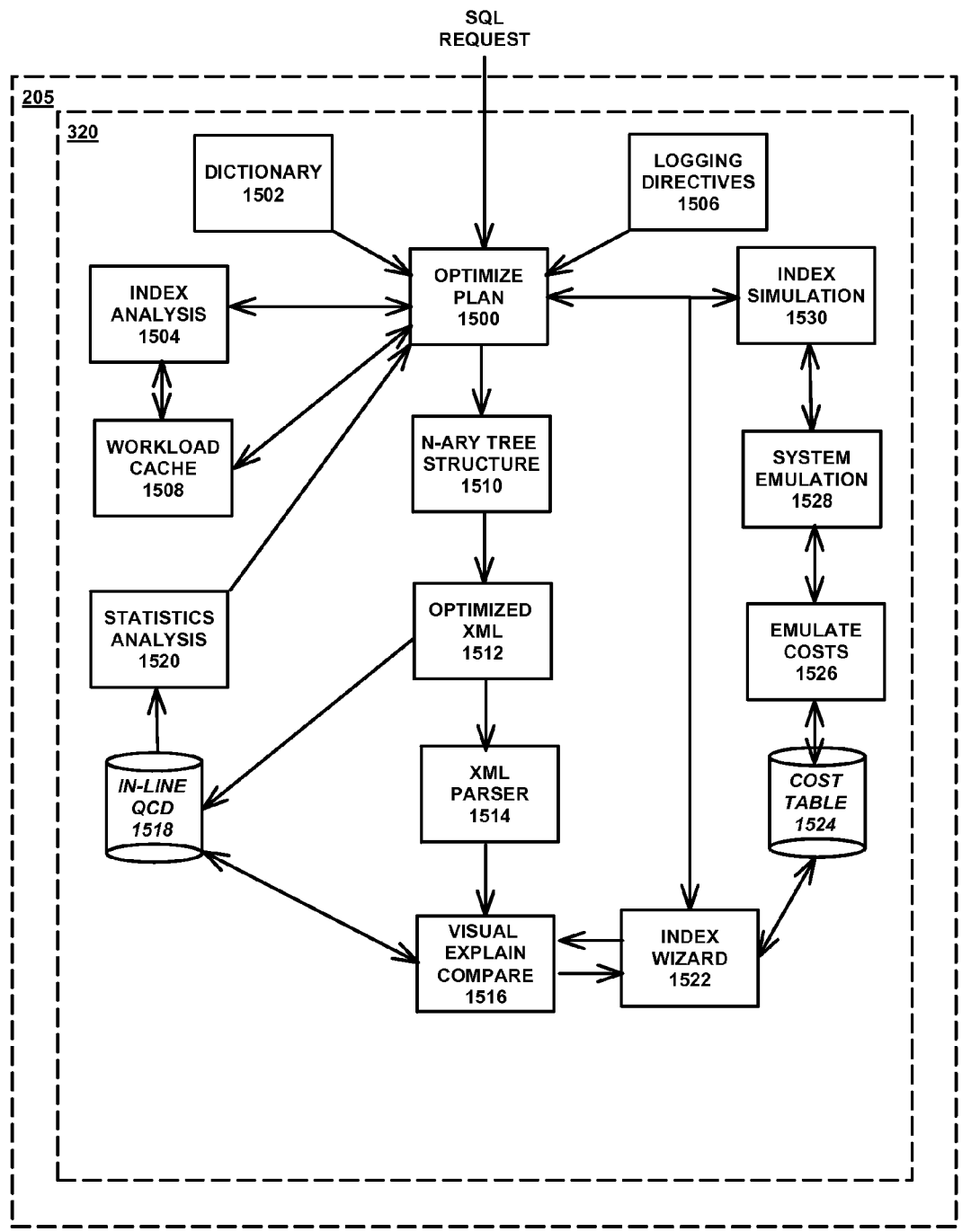
FIG. 15 is a bloc diagram illustrating the structure of the optimizer according to one embodiment of the present invention, including its use of a parallel, in-line, query capture database for real-time logging, monitoring and optimizer feedback.

FIG. 15 illustrates how these extensions for query optimization in real-time during query run-time could be implemented in the Optimizer 320, as described in: Utility patent application Ser. No. 12/229,383, filed on Aug. 22, 2008, by Douglas P. Brown, Anita Richards, Thomas P. Julien, and Louis M. Burger, and entitled Parallel, In-Line, Query Capture Database for Real-Time Logging, Monitoring and Optimizer Feedback, which application claims the benefit of U.S. Provisional Patent Application Ser. No. 61/133,496, which was filed Jun. 30, 2008, both of which applications are incorporated by reference herein.

Specifically, these extensions are implemented using a parallel, In-Line (memory cached) QCD for real-time logging, monitoring, and Optimizer 320 feedback. This In-Line QCD is used to maintain information about query execution plans in real-time for use by any number of different tools and components of the DBS 100.

The steps performed within the Optimizer 320 in processing an SQL request, include plan generation and optimization at 1500, using a dictionary 1502 to ensure that all of the objects specified in the SQL request actually exist and that the user has the authority to perform the request, using an index analysis 1504 to optimize access path selection, and possibly using logging directives 1506, such as INSERT EXPLAIN directives and/or BEGIN/END directives, in order to log information about the plan and its run-time performance. A workload cache 1508 is provided that stores both workload data used during plan generation and optimization at 1500, as well as index recommendations from the index analysis 1504.

The output from step 1500 is an optimized query execution plan comprising an n-ary tree structure stored in a cache 1510 in the Optimizer 320. (The n-ary tree structure is also known as a "white-tree" representation.) In one embodiment, the n-ary tree structure 1510 is an internal data structure of the Optimizer 320 that defines a query execution plan. The n-ary tree structure 1510 includes nodes that comprise access paths to relations (i.e. tables) stored within the database, as well as algebraic operators and predicates that operate on those relations. In this context, the execution of a node comprises the execution of a "step" of the plan.

The n-ary tree structure 1510 may be converted to an optimized XML structure 1512, processed by an XML parser 1514, and then displayed to the user at 1516, so that the user can inspect the plan visually (in an understandable format) and compare it to other plans and performance information that have been logged via the directives 1506. The use of XML allows the plan to be more easily shared among components and tools both internal to the DBS 100 and external to the DBS 100. For example, the XML parser 1514 may display the optimized XML structure 1512 to the user at 1516 using a Document Object Model (DOM) that represents a tree view of the optimized XML structure 1512.

The optimized XML structure 1512 representing the n-ary tree structure 1510 is also stored in an In-Line QCD 1518, namely a set of relational tables in a QCD database in one embodiment. In addition, the optimized XML structure 1512 may also be stored in one or more tables of the DBQL 505.

Moreover, the In-Line QCD 1518 may also store performance information generated during the execution of the plan (for example, the execution of the plan by the plan processor 1415 in FIG. 14 may be monitored in order to generate the performance information). This performance information may comprise actual cost information, such as the cost of processing identified operators and predicates using identified access paths to access relations referenced in the SQL request. The performance information stored in the In-Line QCD 1518 can also be extracted by a statistics analysis component 1520 for use during plan generation and optimization at 1500.

In addition to displaying the optimized XML structure 1512 to the user at 1514, the user can also invoke an Index Wizard 1522, which allows the user to perform index analysis for the plan, resulting in index recommendations to increase the plan's efficiency and to maximize the plan's performance. The index recommendations from the Index Wizard 1522 may also be used during plan generation and optimization at 1500.

In addition, the Index Wizard 1522 generates estimated cost information that may be stored in a cost table 1524, and thereafter used by a cost emulation function at 1526, a system simulation function at 1528, and an index simulation function at 1530, all of which work together to provide a testing environment for the development of plans. Moreover, the results from this testing environment may be used during plan generation and optimization at 1500.

One major difference between this Optimizer 320 and the prior art is that, in the prior art, only the Optimizer 320 can interpret the n-ary tree structure 1510. The prior art had no mechanism to share these internal data structures of the Optimizer 320 with other components of the system without incurring the large costs associated with storing the plans. Instead, the only mechanism available in the prior art is to store SQL "Explain" information in a static format for use in performance analysis after the fact, but not in real-time during run-time.

This Optimizer 320, on the other hand, provides the In-Line QCD 1518 to store the generated query plan (i.e., the optimized XML 1512 generated from the n-ary tree structure 1510), so that the stored plan can be shared by other components of the system for various system management functions. In the prior art, logging this information could quickly consume system resources causing performance problems. In this Optimizer 320, on other hand, the In-Line QCD 1518 allows logging to continue without overburdening system resources.

To further enhance performance, a caching mechanism is provided that temporarily stores the n-ary tree structures 1510 in relational format. These temporarily stored structures 1510 can later be captured by the In-Line QCD 1518, and/or the DBQL 505, in the optimized XML structure 1512, based on a timer or when the cache 1510 fills to some specified percentage (e.g., 80% full).

The use of the In-Line QCD 1518 is significant because components of the system, like the Optimizer 320, TASM components, and other components, can interpret or share the same information in one central location. The result is improved performance of these components. Moreover, this allows "self-diagnosing" query execution plans, via the Optimizer 320 feedback loop shown in FIG. 15 (as well as FIG. 14).

For example, the use of the In-Line QCD 1518, with its storage of query execution plans and performance information related thereto, provides the capability for optimizing the query execution plan, during the execution of the query execution plan. In this situation, even though the query execution plan is an optimal query execution plan (as determined by the Optimizer 320 prior to execution), the query execution plan can be re-optimized during its execution.

Consider that the query execution plan is comprised of a plurality of steps. The re-optimization thus comprises: executing at least some of the steps of the query execution plan; monitoring the execution of the steps of the query execution plan in order to generate the performance information; storing the performance information in the In-Line QCD 1518; and re-optimizing at least some remaining unexecuted steps of the query execution plan using the performance information stored in the In-Line QCD 1518. With regard to the monitoring step, this may further comprise examining results from the execution of the steps of the query execution plan, and then re-optimizing at least some remaining unexecuted steps of the query execution plan based on the examined results. Consequently, providing for re-optimizing of the plan in real-time during run-time improves query performance.

Nonetheless, the goal of the Optimizer 320 remains the same as the prior art: determine the optimal query execution plan, for example, by modeling the execution cost for a set of potential plans and choosing an optimal plan. What differs in this Optimizer 320 is how and when this optimization occurs. In this way, the Optimizer 320 introduces a new dynamic element to query optimization that enhances the available information used in the optimization. Moreover, the Optimizer 320 can generate query plans that are more optimal in real-time during run-time. This is a far more powerful mechanism than prior art mechanisms of optimizing plans.

Figure 16:
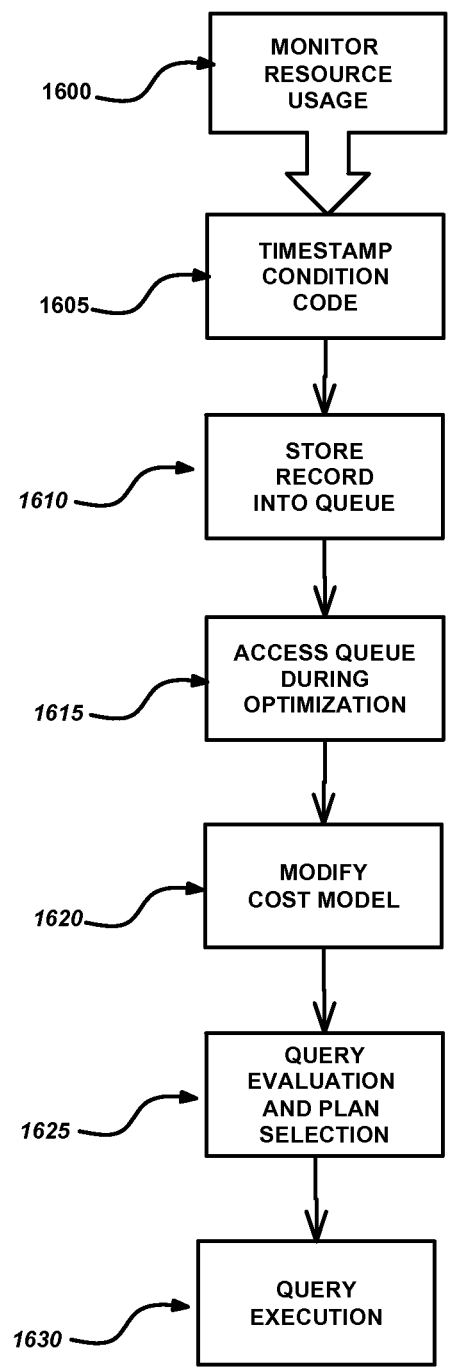
FIG. 16 is a flowchart illustrating the query optimization steps performed when actively managing resource bottlenecks.

FIG. 16 is a flowchart illustrating another improvement to the Optimizer 320, wherein the query optimization steps are performed when actively managing resource bottlenecks. In FIG. 16, resource usage of one or more resources of the DBS 100 is monitored (block 1600) in order to identify resource bottlenecks and other conditions. A condition code representative of the monitored resource usage is timestamped (block 1605) and then stored into a queue (block 1610). During plan preparation and optimization, the queue is accessed (block 1615), and the cost model used for plan preparation and optimization may be modified using the stored condition codes retrieved from the queue (block 1620). One or more candidate query execution plans are generated for the database query, wherein the cost for each of the query execution plans is computed using the modified cost model, and a candidate query execution plan having a lowest cost (and an acceptable response time) is selected for execution (block 1625). This may comprise adaptive selection of the lowest cost query execution plan to alleviate the resource bottleneck condition in the computer system. Alternatively, this may comprise optimization of one or more of the query execution plans, in order to manage the resource bottleneck condition in the computer system. Thereafter, the selected or optimized query execution plan is executed (1630), in order to retrieve data from a database stored on the computer system, wherein the retrieved data is presented to a user for subsequent use and analysis. Specifics of these steps are described in more detail below.

Overall database performance is best achieved when there is a balanced usage of system resources, including CPU, disk I/O, network, and memory, such that no one resource becomes a bottleneck. As noted above, TASM automatically recognizes and responds to exceptions and negative system conditions. While this is a great benefit to users, the corrective action for resource bottlenecks are usually limited to alerting the user who, in turn, must reduce the active workload or perform some other manual solution.

Given the fact that resource bottlenecks are often a direct result of the characteristics of the execution plans chosen by the Optimizer 320, it makes sense to involve the Optimizer 320 in the corrective action process. It is often the case that the Optimizer 320 can choose alternative query execution plans whose response times are still acceptable but whose steps use less of the identified critical resource which, in turn, will help alleviate the resource bottleneck.

The present invention provides a solution to this problem by extending the feedback loop of the cost-based, "learning" Optimizer 320 to respond to run-time resource bottlenecks. The above description focuses on improving (tuning) individual query performance through refreshed statistics and improved cardinality estimates. In contrast, the present invention focuses on the feedback of system resource conditions to the Optimizer 320.

The present invention also influences the query execution plan selection process by the Optimizer 320 to discourage the use of the identified resource by dynamically changing the configurable portions of its cost model. For example, increasing the relative cost or weight for a particular resource in the cost model used by the Optimizer 320 provides a straightforward and effective method for influencing the Optimizer 320 without having to modify its core search and costing algorithms.

The present invention relies on the mechanisms described above in the system's workload management system for monitoring and identifying negative system conditions such as a CPU-bound or I/O bound system. Such mechanisms typically include monitoring system performance counters that measure current resource usage. In addition, the present invention operates within an advanced rule-based exception handling system, such as TASM, where rules can be defined to control the resource allocation for individual workloads. When rules are violated, the system reports "exceptions" and automatically performs the configured corrective action. For those exceptions that identify a resource bottleneck, the present invention offers a new action of providing feedback to the Optimizer 320. (Note that this new action can also be combined with existing actions.)

The present invention also includes enhancements to the Optimizer 320 feedback loop. Specifically, the reporting and monitoring components of the workload management subsystem communicate with the Optimizer 320 via a special dictionary table whose rows represent system conditions such as resource bottlenecks, wherein the system conditions are represented by condition codes. Because such rows represent time-related events, they are stored in "Queue Tables," which are a special type of table that supports FIFO (first-in; first-out) related operations. Depending on the context of a particular condition, a row inserted or "pushed" by the reporting and monitoring components can include a condition code that may optionally be associated with a specified workload. In some cases, the workload management system may be capable of identifying a particular workload as the primary cause of a bottleneck, while, in other cases, the condition code will be applicable to all workloads.

Each row in this new table includes a condition code that is assigned a timestamp by the reporting and monitoring components that indicates when the condition code expires and should be deleted or popped from the Queue Table. If a given condition continues to occur beyond the originally assigned expiration time, another row can be pushed onto the queue to replace the old one. During the regular dictionary lookup phase performed by the Optimizer 320 (e.g., resolving object definitions referenced in the query), it will read or "peek" rows from this new Queue Table. If the condition has expired, the Optimizer 320 will delete or pop the row from the Queue Table. If multiple rows are found, the row with the most recent creation timestamp is acted upon, under the assumption that it represents the most accurate state of the current run-time system.

Following is an SQL data definition for an example of the proposed Queue Table stored in the dictionary:

```
CREATE SET TABLE SysConditions, QUEUE (
    CreationTime TIMESTAMP NOT NULL DEFAULT
CURRENT_TIMESTAMP,
    Expiration TIMESTAMP NOT NULL,
    ConditionCode INTEGER NOT NULL, /* code representing different
conditions */
    WorkloadId INTEGER, /* optional */
    PRIMARY INDEX (ConditionCode,WorkloadId);
```

In using the Queue Table, the Optimizer 320 implements an adaptive cost model. For example, the Optimizer 320 is a cost-based Optimizer 320 that evaluates alternative candidate query execution plans by estimating their resource usage times. A typical Optimizer 320 cost model sums the resources costs from CPU, disk I/O, network operations, etc., and chooses the plan with the lowest total cost. Although the cost model is primarily used to rank alternative plans, it also serves as an approximation of the actual run-time costs.

The Optimizer 320 maintains cost formulas for its various execution algorithms (e.g., table scan, indexed scan, sort-merge join) which, in turn, are comprised of elementary costs associated with low level resource operations. For example, given below is a simplified formula for estimating the cost of performing a table scan and writing the intermediate results to a spool:

(#TotalBlocks * IO_READ) + (#TotalRows * CPU_ROW_ACCESS) + (NumBlocks(#QualifyingRows) * IO_SPOOL_WRITE)

The variables IO_READ, CPU_ROW_ACCESS and IO_SPOOL_WRITE are constants or "coefficients" that represent the time (typically in milliseconds) to perform a resource operation. These coefficients are normally set during installation based on the system's hardware specifications, including its disk throughput and processor speeds. Some database products, such as the Optimizer Cost Estimate Subsystem (OCES) provided by Teradata Corporation, support formal frameworks for managing "Cost Profiles," which define all configurable aspects of the cost model used by the Optimizer 320. OCES is primarily used to adapt the cost model of the Optimizer 320 to different platform configurations but can also be used by sophisticated users to apply different cost models to individual workloads.

One of the basic limitations of the cost models used by the Optimizer 320 is that the cost models do not account for current resource usage levels in the system. The estimated cost for a given plan will be the same regardless of whether the run-time system is heavily loaded or quiescent. Although it may not be feasible to adapt the cost model of the Optimizer 320 to account for all possible run-time states, it is possible for a small set of well known states, which in the present invention is comprised of resource bottleneck conditions, which are defined as a resource that is at or near some predetermined (e.g., 100%) usage or capacity for a sustained period of time. Bottleneck conditions are well suited to adaptive cost models because: (i) they involve one specific resource category, and (ii) the condition often persists until the characteristics of the active workload(s) change.

In the present invention, the Optimizer 320 responds to a resource bottleneck condition by dynamically increasing the elementary costs associated with that resource relative to the cost of other resources in the model. The cost models of the Optimizer 320 then naturally prefer those plans that use less of that particular resource. Rather than changing the cost coefficients themselves, a set of preconfigured "weights" are supplied for each known resource bottleneck condition. Each set of weights is particularly suited and tested for relieving a given type of bottleneck. (Note that OCES cost profiles can easily be extended to incorporate such weights.)

A representative set of weights for a CPU resource bottleneck would be: {W_CPU=1.5, W_IO=1.0, W_NET=1.0}. If the Optimizer 320 performs plan costing such that costs are maintained separately for each resource category, then these weights can simply be applied to the total plan cost as follows:

Total Adapted Cost = W_CPU * cpu_costs + W_IO * io_costs + W_NET * network_costs Alternatively, if total costs are not maintained by resource category, the weights can be applied to the cost coefficients themselves. Each coefficient in the cost model will be associated with a resource category and in the event of a resource bottleneck the relevant set of weights are applied. Using the previous cost formula example, the cost coefficients in the active cost profile would be modified as follows:

IO_READ =              W_IO * IO_READ
CPU_ROW_ACCESS =       W_CPU * CPU_ROW_ACCESS
IO_SPOOL_WRITE =       W_IO * IO_SPOOL_WRITE

The following provides examples of adaptive plan selection according to the preferred embodiment. Although the present invention only indirectly influences the core costing and planning algorithms (access path selection, join planning, etc.) of the Optimizer 320, two specific examples are offered that demonstrate the existence of alternative plans that alleviate a resource bottleneck.

Consider a first example comprising join ordering in a network-saturated system. In this example, rows must by dynamically redistributed (or duplicated) across processors when performing join operations in a parallel environment. Such operations have the potential for saturating the network interconnect with an excessive number of messages. In the absence of any bottleneck information, the Optimizer 320 may decide to choose a particular join order (binary join sequence) that reduces CPU and disk I/O costs by permitting the use of certain binary join algorithms. Although this chosen plan minimizes the summed cost of all resources, it may incur relatively high network costs because of redistribution operations. However, in a system with an already saturated network, a join order that minimizes redistribution operations, even at the expense of higher I/O and CPU, would be better choice. Applying an increased weight factor to network costs will encourage the Optimizer 320 to make this decision.

Consider a second example comprising applying expensive predicates in a CPU-bound system. Complex SQL queries often contain expensive predicates (e.g., User Defined Functions) that are CPU intensive to evaluate. The decision of when to apply the predicate in a multi-step plan is critical, because it must be applied to every qualifying row in the intermediate result for that step. In the absence of any bottleneck information, the Optimizer 320 may decide to apply the expensive predicate early in the plan in an effort to reduce the size of subsequent intermediate results and thus reduce the associated disk I/O. However, in a CPU-bound system, the better choice might be to delay applying the expensive predicate until the end of the plan when the number of qualifying rows is at its smallest. Applying an increased weight factor to CPU costs will encourage the Optimizer 320 to make this decision.

The present invention provides a number of advantages over the prior art. First, the present invention directly involves one of the system components that are most capable of alleviating resource bottlenecks in a SQL database system, namely the Optimizer 320. Second, the present invention is completely automated and requires no direct user intervention. Third, the present invention requires no changes to the core plan selection process of the Optimizer and instead requires only changes to the configurable parameters of its cost model. This approach reduces the complexity of the implementation and reduces risk of negative side-effects to the Optimizer 320.

Consequently, the present invention provides a major step forward in improving the quality of query optimization. In addition, the present invention provides greater run-time awareness in query optimization as compared to prior art query optimization techniques.

Additional information is provided by the following U.S. Patent Applications, which are hereby incorporated by reference herein for all purposes: (1) U.S. Utility patent application Ser. No. 10/730,629, by Douglas P. Brown and Bhashyam Ramesh, and entitled Closed-Loop Estimation of Request Costs; (2) U.S. Utility patent application Ser. No. 10/730,348, filed Dec. 8, 2003, by Douglas P. Brown, Anita Richards, Bhashyam Ramesh, Caroline M. Ballinger and Richard D. Glick, and entitled Administering the Workload of a Database System Using Feedback; (3) U.S. Utility patent application Ser. No. 10/786,448, filed Feb. 25, 2004, by Douglas P. Brown, Bhashyam Ramesh and Anita Richards, and entitled Guiding the Development of Workload Group Definition Classifications; (4) U.S. Utility patent application Ser. No. 10/889,796, filed Jul. 13, 2004, by Douglas P. Brown, Anita Richards, and Bhashyam Ramesh, and entitled Administering Workload Groups; (5) U.S. Utility patent application Ser. No. 10/915,609, filed Aug. 10, 2004, by Douglas P. Brown, Anita Richards, and Bhashyam Ramesh, and entitled Regulating the Workload of a Database System; (6) U.S. Utility patent application Ser. No. 11/328,702, filed Jan. 10, 2006, by Douglas P. Brown, Anita Richards, and Bhashyam Ramesh, and entitled Closed-Loop Predicate Analysis; (7) U.S. Utility patent application Ser. No. 11/468,107, filed Aug. 29, 2006, by Douglas P. Brown and Anita Richards, and entitled A System and Method for Managing a Plurality of Database Systems, which applications claims the benefit of (8) U.S. Provisional Patent Application Ser. No. 60/715,815, filed Sep. 9, 2005, by Douglas P. Brown and Anita Richards, and entitled A System and Method for Managing a Plurality of Database Systems; (9) U.S. Provisional Patent Application Ser. No. 60/877,977, filed on Dec. 29, 2006, by Douglas P. Brown and Anita Richards, and entitled Managing Events in a Computing Environment; (10) U.S. Utility patent application Ser. No. 11/716,889, filed on Mar. 12, 2007, by Douglas P. Brown, Anita Richards, Mark Morris and Todd A. Walter, and entitled Virtual Regulator for Multi-Database Systems, which application claims the benefit of (11) U.S. Provisional Patent Application Nos. 60/877,766, 60/877,767, 60/877,768, and 60/877,823, all of which were filed Dec. 29, 2006; (12) U.S. Utility patent application Ser. No. 11/716,892, filed on Mar. 12, 2007, by Douglas P. Brown, Scott Gnau and Mark Morris, and entitled Parallel Virtual Optimization, which application claims the benefit of (13) U.S. Provisional Patent Application Nos. 60/877,766, 60/877,767, 60/877,768, and 60/877,823, all of which were filed Dec. 29, 2006; (14) U.S. Utility patent application Ser. No. 11/716,880, filed on Mar. 12, 2007, by Mark Morris, Anita Richards and Douglas P. Brown, and entitled Workload Priority Influenced Data Temperature, which application claims the benefit of (15) U.S. Provisional Patent Application Nos. 60/877,766, 60/877,767, 60/877,768, and 60/877,823, all of which were filed Dec. 29, 2006; (16) U.S. Utility patent application Ser. No. 11/716,890, filed on Mar. 12, 2007, by Mark Morris, Anita Richards and Douglas P. Brown, and entitled Automated Block Size Management for Database Objects, which application claims the benefit of (17) U.S. Provisional Patent Application Nos. 60/877,766, 60/877,767, 60/877,768, and 60/877,823, all of which were filed Dec. 29, 2006; (18) U.S. Utility patent application Ser. No. 11/803,248, filed on May 14, 2007, by Anita Richards and Douglas P. Brown, and entitled State Matrix for Workload Management Simplification; (19) U.S. Utility patent application Ser. No. 11/811,496, filed on Jun. 11, 2007, by Anita Richards and Douglas P. Brown, and entitled Arrival Rate Throttles for Workload Management; (20) U.S. Utility patent application Ser. No. 11/891,919, filed on Aug. 14, 2007, by Douglas P. Brown, Pekka Kostamaa, Mark Morris, Bhashyam Ramesh, and Anita Richards, and entitled Dynamic Query Optimization Between Systems Based on System Conditions; (21) U.S. Utility patent application Ser. No. 11/985,910, filed on Nov. 19, 2007, by Douglas P. Brown, Scott E. Gnau, John Mark Morris and William P. Ward, and entitled Dynamic Query and Step Routing Between Systems Tuned for Different Objectives; (22) U.S. Utility patent application Ser. No. 11/985,994, filed on Nov. 19, 2007, by Douglas P. Brown and Debra A. Galeazzi, and entitled Closed-Loop System Management Method and Process Capable of Managing Workloads in a Multi-System Database; (23) U.S. Utility patent application Ser. No. 11/985,909, filed on Nov. 19, 2007, by Douglas P. Brown, John Mark Morris and Todd A. Walter, and entitled Virtual Data Maintenance; (24) U.S. Utility patent application Ser. No. 11/985,911, filed on Nov. 19, 2007, by Douglas P. Brown, Todd A. Walter and Anita Richards, and entitled Dynamic Control and Regulation of Critical Database Resources Using A Virtual Memory Table Interface; (25) U.S. Utility patent application Ser. No. 12/229,397, filed on Aug. 22, 2008, by Douglas P. Brown, Anita Richards, Louis M. Burger and Thomas P. Julien, and entitled Dynamic Run-Time Optimization Using Automated System Regulation For A Parallel Query Optimizer, which application claims the benefit of (26) U.S. Provisional Patent Application No. 61/133,493, which was filed Jun. 30, 2008; (27) Utility patent application Ser. No. 12/229,383, filed on Aug. 22, 2008, by Douglas P. Brown, Anita Richards, Thomas P. Julien, and Louis M. Burger, and entitled Parallel, In-Line, Query Capture Database for Real-Time Logging, Monitoring and Optimizer Feedback, which application claims the benefit of (28) U.S. Provisional Patent Application Ser. No. 61/133,496, which was filed Jun. 30, 2008; all of which are incorporated by reference herein.

We claim:

1. A computer-implemented method for optimizing a database query in a computer system, comprising:

using a cost model to generate at least one query execution plan;

monitoring, in the computer system, resource usage of one or more resources of the computer system;

storing, in the computer system, a condition code representative of the monitored resource usage;

modifying, in the computer system, the cost model using the stored condition code by modifying at least one cost associated with at least one of the one or more resources in order to obtain a modified cost model;

generating, in the computer system, a query execution plan for at least one database query using the modified cost model, wherein the generating step performs adaptive selection of the query execution plan to alleviate the resource condition in the computer system; and executing, in the computer system, the query execution plan, wherein a resource condition in the computer system results in costs associated with the resource being increased relative to costs of other resources.

2. The method of claim 1, wherein the condition code is associated with a specified workload.

3. The method of claim 1, wherein the condition code is stored into a queue.

4. The method of claim 3, wherein the condition code has an expiration time indicating when it is to be deleted from the queue.

5. The method of claim 3, wherein the condition code is timestamped prior to being stored into the queue and the condition code most recently timestamped is acted upon.

6. The method of claim 1, wherein the cost model is modified to discourage use of one or more of the resources of the computer system by dynamically changing configurable portions of the cost model.

7. The method of claim 1, wherein generating step further comprises optimizing the query execution plan to manage a resource bottleneck condition in the computer system.

8. The method of claim 1, wherein one or more candidate query execution plans are generated for the query, a cost for each of the candidate query execution plans is computed using the modified cost model, and a candidate query execution plan having a lowest cost is selected for execution.

9. The method of claim 8, wherein the candidate query execution plan having the lowest cost with an acceptable response time is selected for execution.

10. An apparatus for optimizing a database query in a computer system, the apparatus comprising one or more processors configured to:

monitor resource usage of one or more resources of the computer system;

store a condition code representative of the monitored resource usage;

modify a cost model using the stored condition code;

generate a query execution plan for the database query using the modified cost model, wherein the generate performs adaptive selection of the query execution plan to alleviate the resource condition in the computer system; and execute the query execution plan in order to retrieve data from a database stored on the computer system, wherein a resource condition in the computer system results in costs associated with the resource being increased relative to costs of other resources.

11. The apparatus of claim 10, wherein the condition code is associated with a specified workload.

12. The apparatus of claim 10, wherein the condition code is stored into a queue.

13. The apparatus of claim 12, wherein the condition code has an expiration time indicating when it is to be deleted from the queue.

14. The apparatus of claim 12, wherein the condition code is timestamped prior to being stored into the queue and the condition code most recently timestamped is acted upon.

15. The apparatus of claim 10, wherein the cost model is modified to discourage use of one or more of the resources of the computer system by dynamically changing configurable portions of the cost model.

16. The apparatus of claim 10, wherein the generate further comprises means for optimizing the query execution plan to manage a resource bottleneck condition in the computer system.

17. The apparatus of claim 10, wherein one or more candidate query execution plans are generated for the query, a cost for each of the candidate query execution plans is computed using the modified cost model, and a candidate query execution plan having a lowest cost is selected for execution.

18. The apparatus of claim 17, wherein the candidate query execution plan having the lowest cost with an acceptable response time is selected for execution.

19. An article of manufacture comprising one or more non-transitory storage devices tangibly embodying instructions that, when executed by a computer system, result in the computer system performing a method for optimizing a database query, the method comprising:

monitoring, in the computer system, resource usage of one or more resources of the computer system;

storing, in the computer system, a condition code representative of the monitored resource usage;

modifying, in the computer system, a cost model using the stored condition code;

generating, in the computer system, a query execution plan for the database query using the modified cost model, wherein the generating step performs adaptive selection of the query execution plan to alleviate the resource condition in the computer system; and executing, in the computer system, the query execution plan, wherein a resource condition in the computer system results in costs associated with the resource being increased relative to costs of other resources.

20. The article of claim 19, wherein the condition code is associated with a specified workload.

21. The article of claim 19, wherein the condition code is stored into a queue.

22. The article of claim 21, wherein the condition code has an expiration time indicating when it is to be deleted from the queue.

23. The article of claim 21, wherein the condition code is timestamped prior to being stored into the queue and the condition code most recently timestamped is acted upon.

24. The article of claim 19, wherein the cost model is modified to discourage use of one or more of the resources of the computer system by dynamically changing configurable portions of the cost model.

25. The article of claim 19, wherein generating step further comprises optimizing the query execution plan to manage a resource bottleneck condition in the computer system.

26. The article of claim 19, wherein one or more candidate query execution plans are generated for the query, a cost for each of the candidate query execution plans is computed using the modified cost model, and a candidate query execution plan having a lowest cost is selected for execution.

27. The article of claim 26, wherein the candidate query execution plan having the lowest cost with an acceptable response time is selected for execution.

* * * * *